United States Patent
Masazumi et al.

(10) Patent No.: US 6,812,913 B2
(45) Date of Patent: Nov. 2, 2004

(54) LIQUID CRYSTAL DISPLAY DRIVING METHOD AND LIQUID CRYSTAL DISPLAY DEVICE

(75) Inventors: Naoki Masazumi, Kobe (JP); Makiko Mandai, Takatsuki (JP); Tsukasa Yagi, Kobe (JP); Mikihiro Komatsu, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 412 days.

(21) Appl. No.: 09/783,061

(22) Filed: Feb. 14, 2001

(65) Prior Publication Data

US 2001/0024188 A1 Sep. 27, 2001

(30) Foreign Application Priority Data

| Feb. 17, 2000 | (JP) | 2000-039521 |
| May 24, 2000 | (JP) | 2000-152504 |
| May 25, 2000 | (JP) | 2000-154634 |

(51) Int. Cl.$^7$ ................................................ G09G 3/36
(52) U.S. Cl. ................................. 345/94; 345/87
(58) Field of Search ................................. 345/87–103

(56) References Cited

U.S. PATENT DOCUMENTS

| 3,995,942 A | * 12/1976 | Kawakami et al. ........... 345/94 |
| 4,380,008 A | * 4/1983 | Kawakami et al. ........... 345/94 |
| 5,274,484 A | * 12/1993 | Mochizuki et al. .......... 349/33 |
| 5,684,503 A | * 11/1997 | Nomura et al. ............. 345/97 |
| 5,748,277 A | 5/1998 | Huang et al. ............... 349/169 |
| 5,917,465 A | * 6/1999 | Mochizuki et al. .......... 345/94 |
| 6,278,429 B1 | * 8/2001 | Ruth et al. .................. 345/94 |

FOREIGN PATENT DOCUMENTS

WO   WO 98/50804 A2   11/1998

* cited by examiner

Primary Examiner—Alexander Eisen
(74) Attorney, Agent, or Firm—Sidley Austin Brown & Wood LLP

(57) ABSTRACT

A matrix driving method for liquid crystal display having liquid crystal which exhibits cholesteric phase and capability of keeping image displayed after turn-off of electric field applied by using scan electrodes and data electrodes arranged to face and cross each other with the liquid crystal in between, includes applying reset pulse to reset liquid crystal to homeotropic state, selecting final state of liquid crystal, and stabilizing liquid crystal to selected state. The selection step includes, in order named, a first time of applying substantially 0 volt to liquid crystal, a second time of applying selection pulse to select final state of liquid crystal, and a third time of applying substantially 0 volt to liquid crystal. In first or second time, a compensation pulse may be applied to liquid crystal in form determined depending on temperature or so that a plurality of liquid crystal layers will have same scanning speed.

31 Claims, 26 Drawing Sheets

FIG. 5
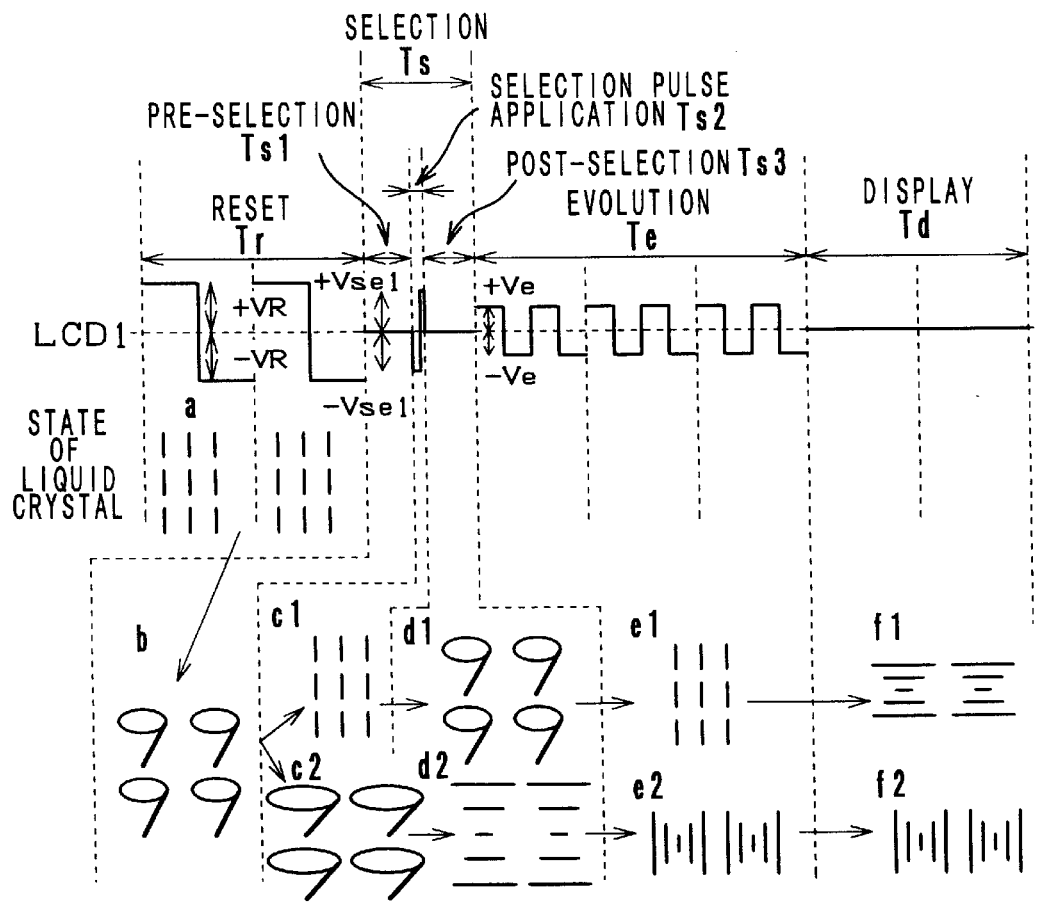
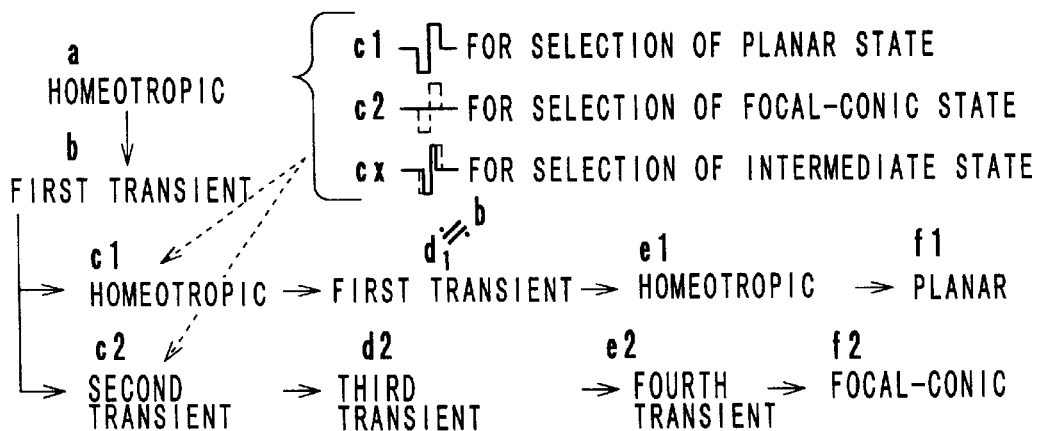

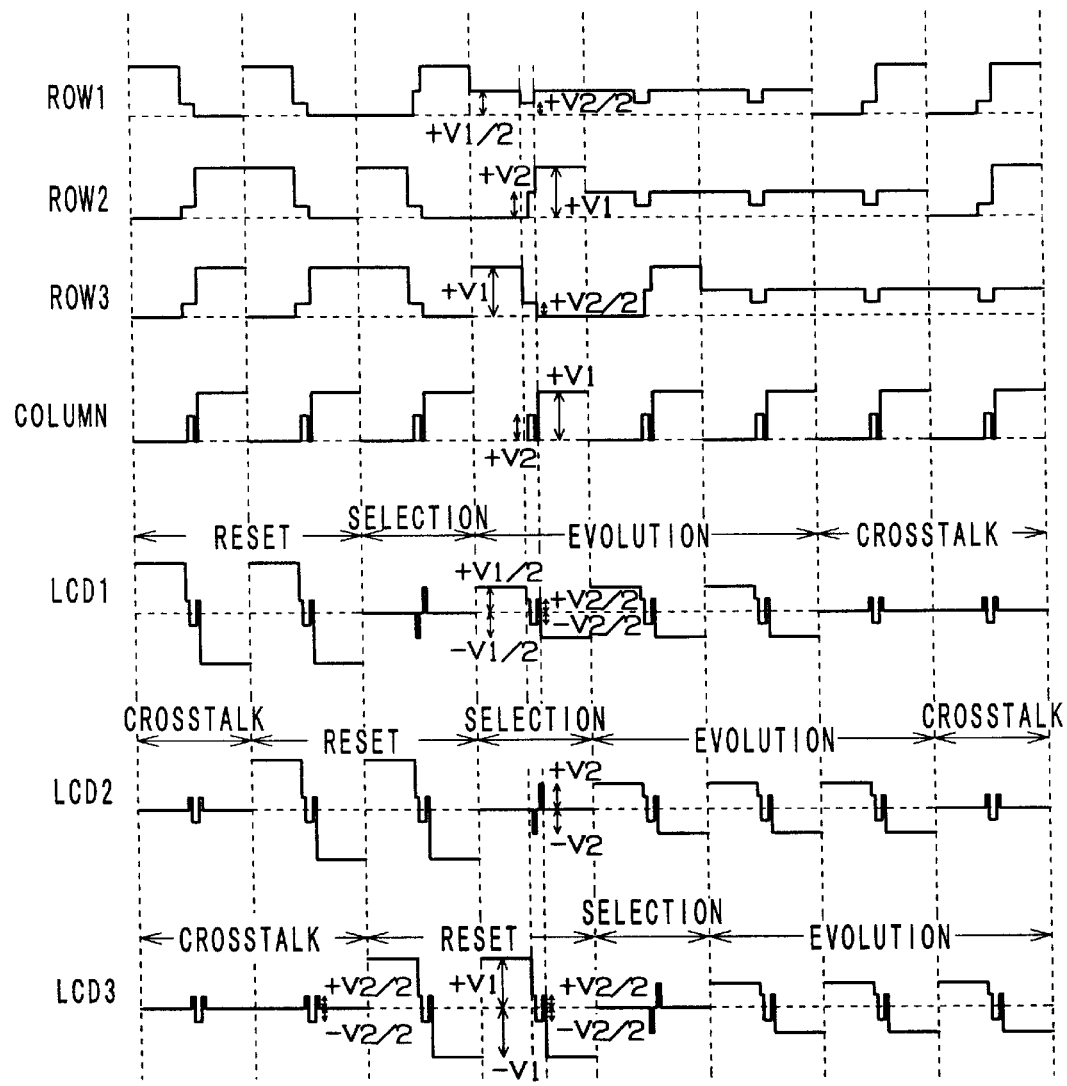
F I G. 17
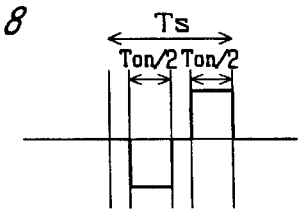
F I G. 18
FORM OF
SELECTION PULSE
LCD2

FORM OF SELECTION PULSE LCD2

F I G. 22
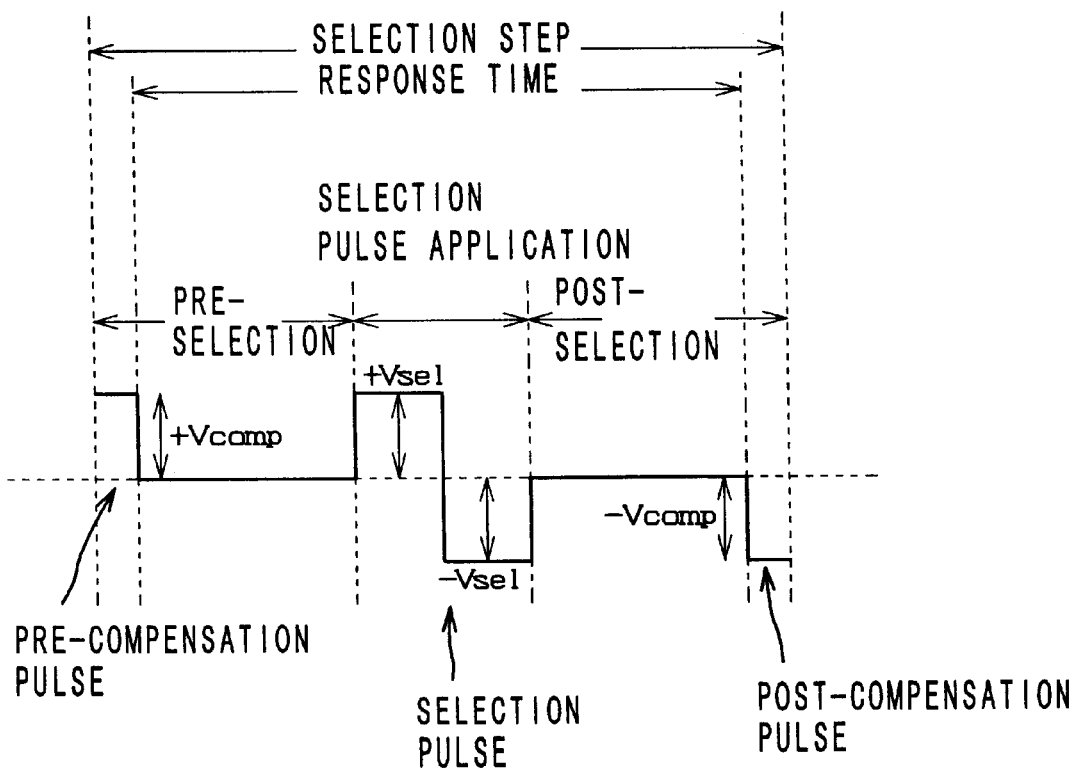

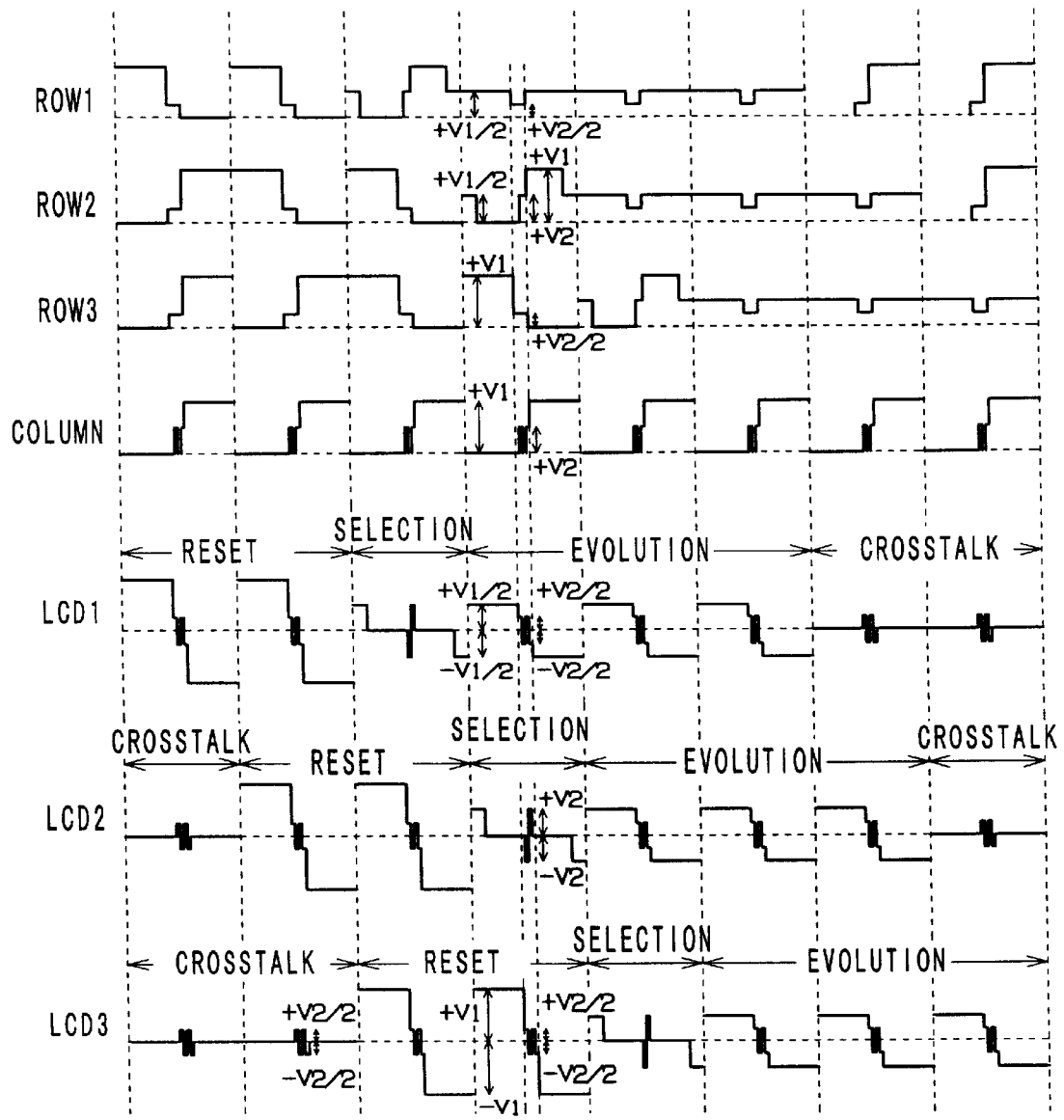
F I G. 23

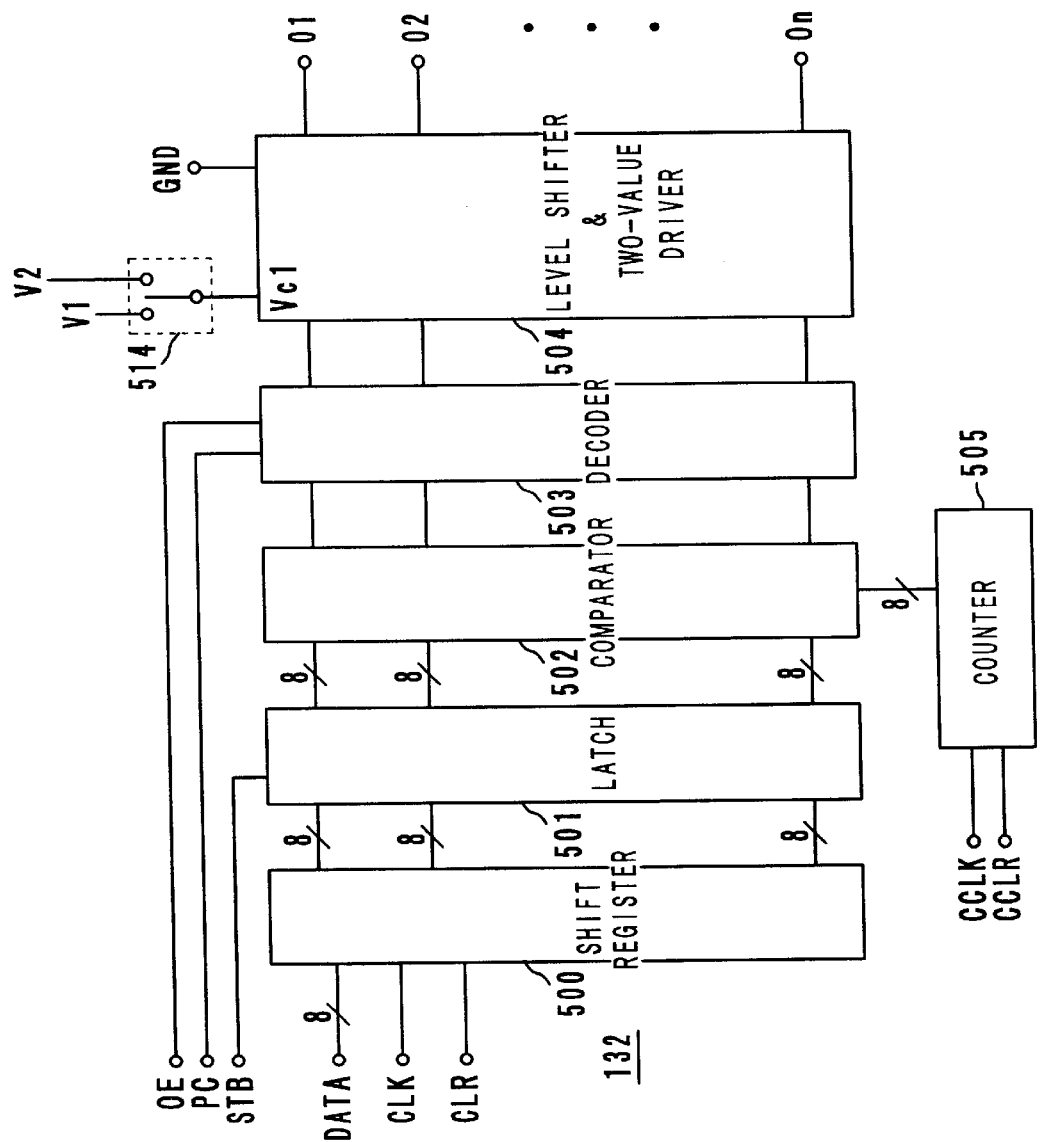
F I G. 25

F I G. 2 6
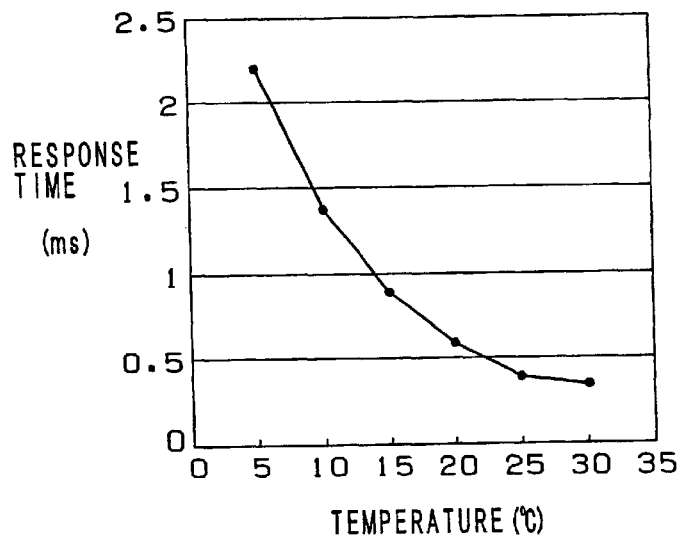
F I G. 2 7
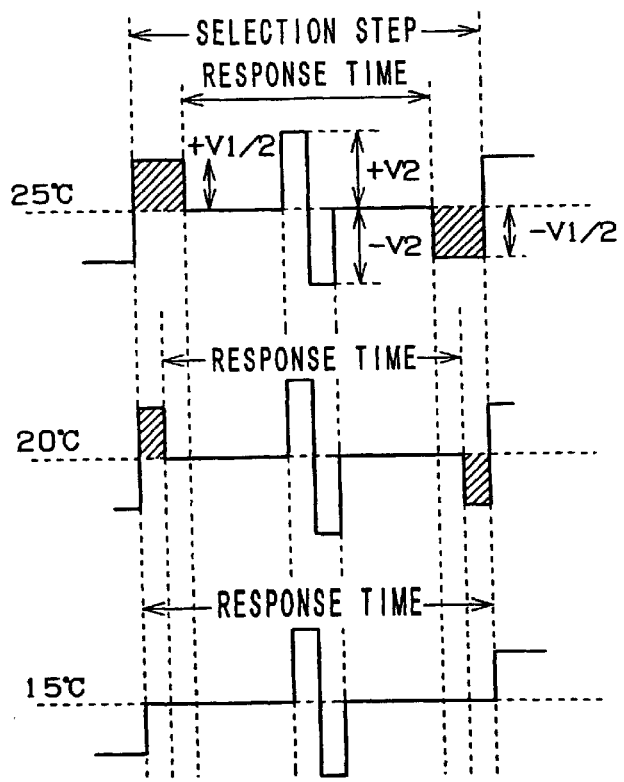

F I G. 3 1
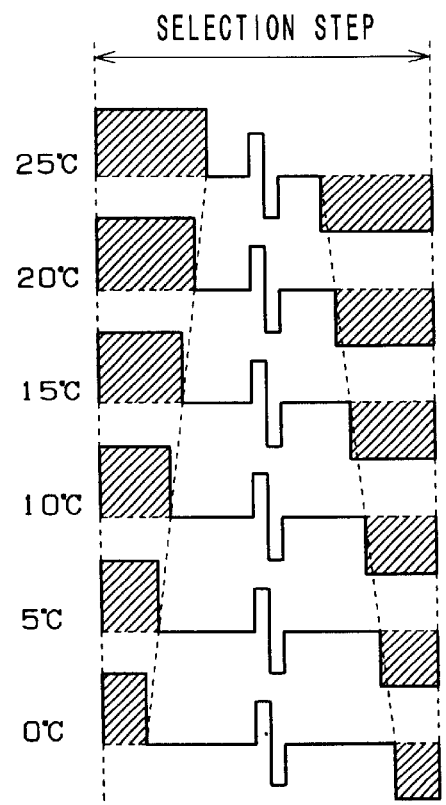
F I G. 3 2
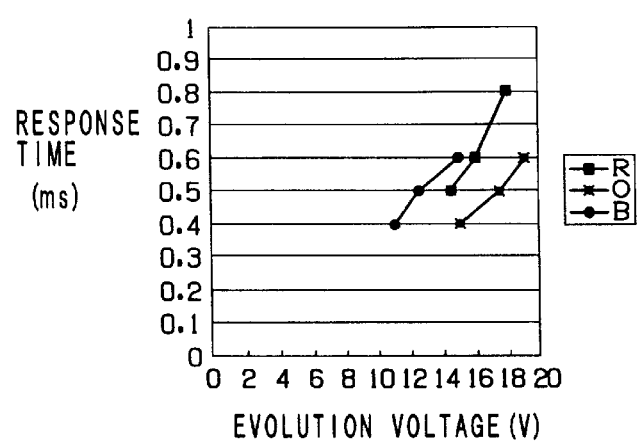

LIQUID CRYSTAL DISPLAY DRIVING METHOD AND LIQUID CRYSTAL DISPLAY DEVICE

This application is based on Japanese application Nos. 2000-39521, 2000-152504 and 2000-154634 filed in Japan, the contents of which are hereby incorporated by reference.

BACKGROUND OF THE INVENTION

1. Field of the Invention

The present invention relates to a method of driving a liquid crystal display, and more specifically to a method of driving a liquid crystal display which comprises liquid crystal which exhibits a cholesteric phase and is capable of keeping an image displayed thereon after turn-off of the electric field applied thereto.

2. Description of Prior Art

In recent years, reflective type liquid crystal displays which use liquid crystal which exhibits a cholesteric phase at room temperature such as chiral nematic liquid crystal have been developed to be used as media for reproducing digital information as visual information because such liquid crystal displays consume little electric power and can be fabricated at low cost. However, such a liquid crystal display which uses liquid crystal with a memory effect has a demerit in that the driving speed is low.

A well-known prior art U.S. Pat. No. 5,748,277 discloses a method of driving bistable liquid crystal. The method comprises a preparation phase to cause the liquid crystal to come to a homeotropic state, a selection phase to select the liquid crystal to come to a focal-conic state or a planar state and an evolution phase to cause the liquid crystal to evolve to the desired final state. In the selection phase, by controlling the voltage applied to the liquid crystal to either one of two (high and low) levels, the state of the liquid crystal is selected.

However, this driving method has the following drawbacks: this driving method permits only a display with two tones and does not make a display with intermediate tones; this driving method requires a driving IC which has at least seven output levels to drive the scan electrodes and a driving IC which has at least two output levels to drive the data electrodes, that is, it requires costly drivers; and after the selection to determine the final states of pixels, pulse voltages are applied to the pixels from the data electrodes directly, and the image will be degraded because of crosstalk.

Incidentally, it is known that the response characteristic of chiral nematic liquid crystal to the voltage applied thereto changes depending on the temperature. Accordingly, when the temperature changes, the liquid crystal may make an incomplete display and may not be able to make a display.

When liquid crystal display layers for R, G and B are laminated to make a full-color display, the response characteristics of the respective liquid crystal materials in the liquid crystal display layers to the electric field applied thereto are different from each other. If mutually different optimal lengths are set as the respective selection steps of the display layers, the display layers will have different scanning times. The scanning time means the time from the start of selection step of a scan electrode to the start of selection step of the next scan electrode.

SUMMARY OF THE INVENTION

An object of the present invention is to provide an improved method of driving a liquid crystal display and an improved liquid crystal display device which do not have the above problems.

In order to attain the object, a first driving method according to the present invention is a method for driving a liquid crystal display which comprises liquid crystal which exhibits a cholesteric phase and is capable of keeping an image displayed thereon after turn-off of an electric field applied thereto, and the method comprises: a reset step of applying a reset pulse to make the liquid crystal come to a homeotropic state; a selection step of, after the reset step, selecting a final state of the liquid crystal; and an evolution step of, after the selection step, applying an evolution pulse to stabilize the liquid crystal to the state selected in the selection step. The selection step comprises: a first step which comprises a time of applying substantially 0 volt to the liquid crystal; a second step of, after the first step, applying a selection pulse to select the final state of the liquid crystal; and a third step, after the second step, which comprises a time of applying substantially 0 volt to the liquid crystal.

In this first driving method, since the liquid crystal is driven in the reset step, in the selection step and in the evolution step, a desired image can be written on the liquid crystal at a relatively high speed. Moreover, in the first step and in the third step of the selection step, there are times in which the voltage applied to the liquid crystal is made substantially zero and consequently, the number of output levels of a driver can be reduced.

In the first driving method, the lengths of the reset step, the selection step and the evolution step may be multiples of the shortest one of these lengths. The selection pulse may be of a lower voltage than the reset pulse.

The state of the liquid crystal may be selected by changing the pulse width of the selection pulse. Variations of the selection pulse in pulse width result in display of various intermediate tones. In this case, in the second step, the pulse width of the selection pulse is adjusted in accordance with the desired final state of the liquid crystal.

In the first driving method, the liquid crystal display further comprises a plurality of scan electrodes and a plurality of data electrodes which are arranged to face and cross each other with the liquid crystal in-between, and these scan electrodes and data electrodes define a plurality of display units of the liquid crystal display. The scan electrodes may be selected serially to be subjected to at least the selection step and the evolution step. All the scan electrodes may be selected at one time to be subjected to the reset step.

In the case of selecting all the scan electrodes simultaneously for the reset step, while the display units on one of the scan electrodes are in the selection step, an evolution pulse of a voltage with an absolute value larger than 0 is applied to the scan electrode which is to come to the selection step next. With the application of the evolution pulse, the display units on the scan electrode which is to come to the selection step next can be kept in the reset state.

In the case of selecting the scan electrodes serially for the reset step, the scan electrodes are selected at lags of a time which corresponds to the length of the selection step. In this case, at least one of the first step and the third step may include a time of applying a compensation pulse to avoid necessity of changing the length of the selection step. Thereby, the length of the selection step can be fixed in any case. If compensation pulses are applied both in the first step and in the third step, the application times of the compensation pulses in the first step and in the third step are preferably equal to each other.

At least one of the first step and the third step may include a time of applying a compensation pulse to compensate for a change in responsiveness of the liquid crystal with a change in temperature. In this case, the form of the compensation pulse depends on the temperature. Thereby, regardless of the temperature, display of a quality image can be realized at all times. Also, it is possible to change the length of the selection step depending on in what range the temperature is.

At least one of the first step and the third step may include a time of applying a compensation pulse to avoid necessity of changing the length of the selection step. In a liquid crystal display which comprises a plurality of liquid crystal layers, by applying appropriate compensation pulses to the respective liquid crystal layers, the differences among the liquid crystal layers in responsiveness can be corrected, and it becomes possible that the liquid crystal layers can have the same scanning speed. Further, the application times of the compensation pulses applied to the respective liquid crystal layers may be so set that the evolution pulses applied to the respective liquid crystal layers will have the same voltage or the same pulse width. Thereby, the structure of the power source circuit can be simplified.

In the case of selecting the scan electrodes serially, the scan electrodes are selected at lags of a specified time. In this case, the time length of the reset step is a multiple of the specific time, and the reset pulse may include a plurality of periods each of which is equal to the specific time. Preferably, in consecutive periods, the last reset pulse element in the former period and the first reset pulse element in the latter period are of the same polarity. Also, the time length of the evolution step is a multiple of the specific time, and the evolution pulse may include a plurality of periods each of which is equal to the specific time. In this case, preferably, in consecutive periods, the last evolution pulse element in the former period and the first evolution pulse element in the latter period are of the same polarity.

In other words, polarity inversion is not necessary between the last reset pulse element in the former period and the first reset pulse element in the latter period or between the last evolution pulse element in the former period and the first evolution pulse element in the latter period. Thereby, the number of polarity inversions in the reset step or in the evolution step can be reduced, and the power consumption can be reduced.

In the case of adjusting the pulse width of the selection pulse in accordance with the desired final state of the liquid crystal in the second step, the second step includes a first period of applying a pre-selection pulse and a second period of applying a post-selection pulse, and preferably, the pre-selection pulse and the post-selection pulse are of mutually opposite polarities.

The pulse width of the pre-selection pulse may be adjusted based on the beginning of the first period, and the pulse width of the post-selection pulse may be adjusted based on the beginning of the second period. Also, the pulse width of the pre-selection pulse may be adjusted based on the end of the first period, and the pulse width of the post-selection pulse may be adjusted based on the end of the second period.

A second driving method according to the present invention is a method for driving a liquid crystal display which comprises liquid crystal which exhibits a cholesteric phase and is capable of keeping an image displayed thereon after turn-off of an electric field applied thereto, and a plurality of scan electrodes and a plurality of data electrodes which are arranged to face and cross each other with the liquid crystal in-between, the scan electrode and the data electrodes defining a plurality of display units, said method comprising the steps of: applying a first voltage signal to one of the scan electrodes which defines display units which are to continue displaying an image; and applying a second voltage signal in accordance with image data to the data electrodes so that crosstalk pulses are applied to the display units which are to continue displaying an image. The first voltage signal and the second voltage signal have such waveforms that the condition that the crosstalk pulses are smaller than the second voltage signal in energy and/or pulse width can be fulfilled.

In the second driving method, the energy and/or the pulse width of the crosstalk pulses are/is small, which means that each pixel is not so strongly influenced by crosstalk from the adjacent pixels, and degradation of the image can be prevented.

A liquid crystal display device according to the present invention comprises: a liquid crystal display comprising liquid crystal which exhibits a cholesteric phase and is capable of keeping an image displayed thereon after turn-off of an electric field applied thereto; and a plurality of scan electrodes and a plurality of data electrodes which are arranged to face and cross each other with the liquid crystal in-between. The liquid crystal display device further comprises a scan electrode driver which is connected to the scan electrodes and which is capable of outputting voltages at not more than three different levels; and a data electrode driver which is connected to the data electrodes and which is capable of outputting voltages at not more than two different levels.

In the liquid crystal display device, drivers which have a small number of output levels are used, and the driving circuit is simple.

BRIEF DESCRIPTION OF THE DRAWINGS

This and other objects and features of the present invention will be apparent from the following description with reference to the accompanying drawings, in which:

FIG. 5 is an illustration which shows a first principle of the driving method according to the present invention;

FIG. 17 is a chart which shows driving waveforms in a sixth example;

FIG. 18 is a chart which shows a selection pulse in the sixth example;

FIG. 22 is a chart which shows a driving waveform in a selection step based on the second principle;

FIG. 23 is a chart which shows driving waveforms in a ninth example;

FIG. 25 is a block diagram which shows a data electrode driving IC used in the ninth example;

FIG. 26 is a graph which shows the relationship between the temperature and the response speed of liquid crystal;

FIG. 27 is a chart which shows adjustment of the width of compensation pulses in the ninth example;

FIG. 31 is a chart which shows adjustment of the width of compensation pulses in a thirteenth example; and FIG. 32 is a graph which shows the relationship between the evolution voltage and the response time, which is a fundamental of a fourteenth example.

DETAILED DESCRIPTION OF THE PREFERRED EMBODIMENTS

Embodiments of a liquid crystal display driving method and a liquid crystal display device according to the present invention are described with reference to the accompanying drawings.

Liquid Crystal Display; See FIGS. 1–4

First, a liquid crystal display which is employed in a liquid crystal display device and which comprises liquid crystal which exhibits a cholesteric phase is described.

Figure 1:
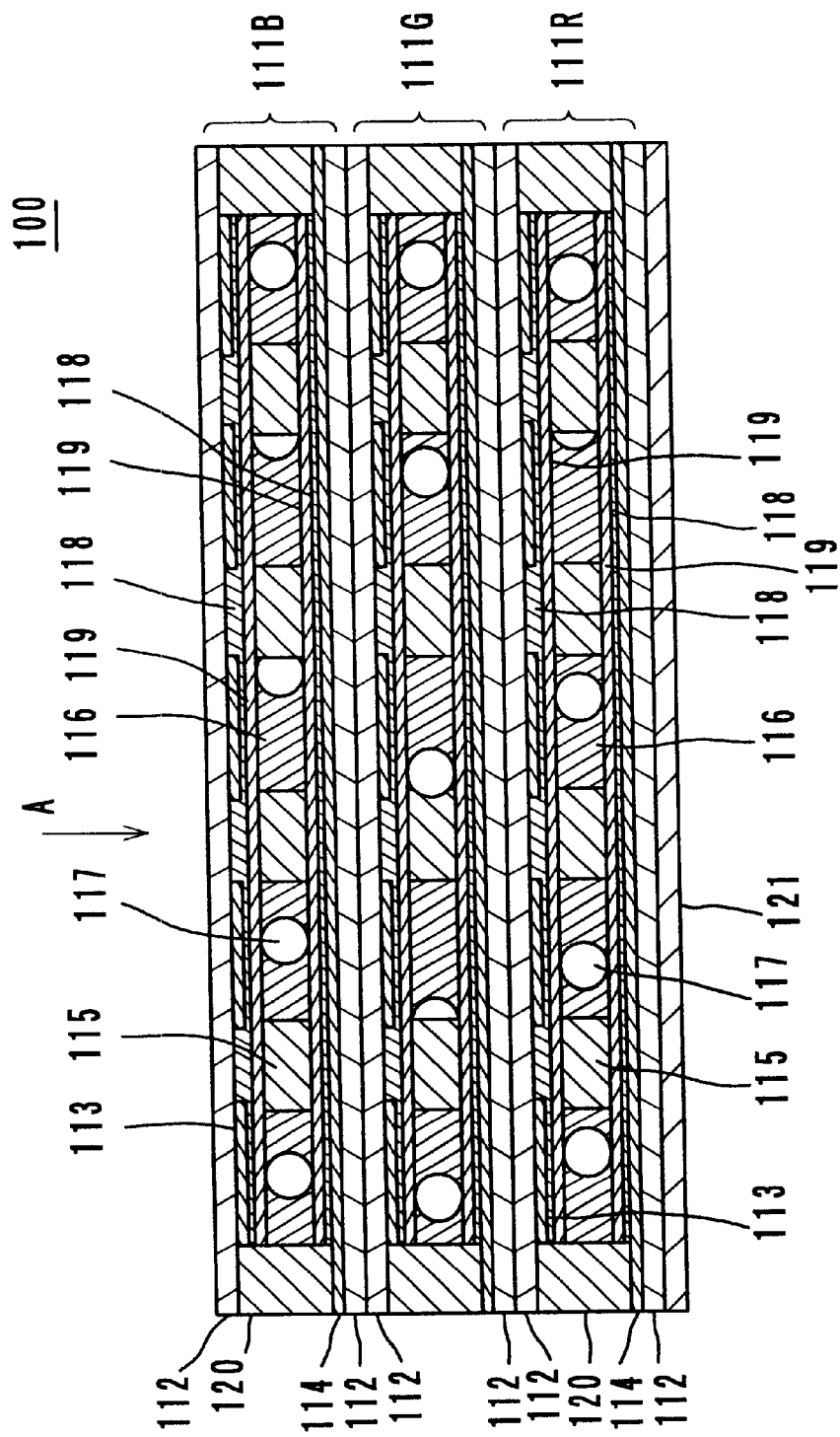
FIG. 1 is a sectional view of an exemplary liquid crystal display to which a driving method according to the present invention is applied.

FIG. 1 shows a reflective type full-color liquid crystal display which is driven by a simple matrix driving method. In this liquid crystal display 100, on a light absorbing layer 121, a red display layer 111R, a green display layer 111G and a blue display layer 111B are laminated. The red display layer 111R makes a display by switching between a red selective reflection state and a transparent state. The green display layer 111G makes a display by switching between a green selective reflection state and a transparent state. The blue display layer 111B makes a display by switching between a blue selective reflection state and a transparent state.

Each of the display layers 111R, 111G and 111B has, between transparent substrates 112 on which transparent electrodes 113 and 114 are formed, resin columnar nodules 115, liquid crystal 116 and spacers 117. On the transparent electrodes 113 and 114, an insulating layer 118 and an alignment controlling layer 119 are provided if necessary. Around the substrates 112 (out of a displaying area), a sealant 120 is provided to seal the liquid crystal 116 therein.

The transparent electrodes 113 and 114 are connected to driving ICs 131 and 132 respectively (see FIG. 4), and specified pulse voltages are applied between the transparent electrodes 113 and 114. In response to the voltages applied, the liquid crystal 116 switches between a transparent state to transmit visible light and a selective reflection state to selectively reflect light of a specified wavelength.

In each of the display layers 111R, 111G and 111B, the transparent electrodes 113 and 114, respectively, are composed of a plurality of strip-like electrodes which are arranged in parallel at fine intervals. The extending direction of the strip-like electrodes 113 and the extending direction of the strip-like electrodes 114 are perpendicular to each other, and the electrodes 113 and the electrodes 114 face each other. Electric power is applied between these upper electrodes and lower electrodes serially, that is, voltages are applied to the liquid crystal 116 serially in a matrix, so that the liquid crystal 116 makes a display. This is referred to as matrix driving. The intersections between the electrodes 113 and 114 function as pixels. By carrying out this matrix driving toward the display layers 111R, 111G and 111B serially or simultaneously, a full-color image is displayed on the liquid crystal display 100.

A liquid crystal display which has liquid crystal which exhibits a cholesteric phase between two substrates makes a display by switching the liquid crystal between a planar state and a focal-conic state. When the liquid crystal is in the planar state, the liquid crystal selectively reflects light of a wavelength λ=Pn (P: helical pitch of the cholesteric liquid crystal, n: average refractive index). When the liquid crystal display is in the focal-conic state, if the wavelength of light selectively reflected by the liquid crystal is in the infrared spectrum, the liquid crystal scatters light, and if the wavelength of light selectively reflected by the liquid crystal is shorter than the infrared spectrum, the liquid crystal transmits visible light. Accordingly, if the wavelength of light selectively reflected by the liquid crystal is set within the visible spectrum and if a light absorbing layer is provided in the side opposite the observing side of the display, the liquid crystal display makes displays as follows: when the liquid crystal is in the planar state, the liquid crystal display makes a display of the color determined by the selectively reflected light; and when the liquid crystal is in the focal-conic state, the liquid crystal display makes a display of black. Also, if the wavelength of light selectively reflected by the liquid crystal is set within the infrared spectrum and if a light absorbing layer is provided in the side opposite the observing side of the display, the liquid crystal display makes displays as follows: when the liquid crystal is in the planar state, the liquid crystal reflects infrared light but transmits visible light, and accordingly, the liquid crystal display makes a display of black; and when the liquid crystal display is in the focal-conic state, the liquid crystal scatters light, and accordingly, the liquid crystal display makes a display of white.

In the liquid crystal display 100 in which the display layers 111R, 111G and 111B are laminated, when the liquid crystal of the blue display layer 111B and the liquid crystal of the green display layer 111G are in the focal-conic state (transparent state) and when the liquid crystal of the red display layer 111R is in the planar state (selective reflection state), a display of red is made. When the liquid crystal display of the blue display layer 111B is in the focal-conic state (transparent state) and when the liquid crystal of the green display layer 111G and the liquid crystal of the red display layer 111R are in the planar state (selective reflection state), a display of yellow is made. Thus, by setting the display layers 111R, 111G and 111B in the transparent state or in the selective reflection state appropriately, displays of red, green, blue, white, cyan, magenta, yellow and black are possible. Further, by setting the display layers 111R, 111G and 111B in intermediate states, displays of intermediate colors are possible, and thus, the liquid crystal display 100 can be used as a frill-color display.

As the transparent substrates 112, transparent glass plates and transparent resin films are usable.

As the transparent electrodes 113 and 114, transparent electrodes of ITO (indium tin oxide), metal electrodes such as aluminum, silicon, etc., and electrodes of photoconductive films such as amorphous silicon, BSO (bismuth silicon oxide), etc. are usable. The transparent electrodes 114 on the lowermost layer may be black electrodes so as to also function as a light absorber.

As the insulating layers 118, inorganic films such as silicon oxide, etc. and organic films such as polyimide resin, epoxy resin, etc. are usable so as to also function as a gas barrier layer. The insulating layers 118 prevent short-circuits among the substrates 112 and improve the reliability of the liquid crystal. As the alignment controlling layers 119, typically polyimide is used.

The liquid crystal 116 preferably exhibits a cholesteric phase at room temperature. Especially chiral nematic liquid crystal which is produced by adding a chiral agent to nematic liquid crystal is suitable.

A chiral agent is an additive which, when it is added to nematic liquid crystal, twists molecules of the nematic liquid crystal. When a chiral agent is added to nematic liquid crystal, the liquid crystal molecules form a helical structure with uniform twist intervals, and thereby, the liquid crystal exhibits a cholesteric phase.

Chiral nematic liquid crystal has an advantage that the pitch of the helical structure can be changed by changing the concentration of the chiral agent, whereby the wavelength of light to be reflected by the liquid crystal can be controlled. Generally, as a term expressing the pitch of the helical structure of liquid crystal molecules, the term "helical pitch," which is defined as the distance between liquid crystal molecules which are located at an angle of 360 degrees to each other along the helical structure, is used.

For the columnar nodules 115, for example, thermoplastic resin can be used. The material of the columnar nodules 115 is required to be softened by heat, to be hardened by cooling, to not react chemically to the liquid crystal material used, and to have appropriate elasticity.

Figure 2:
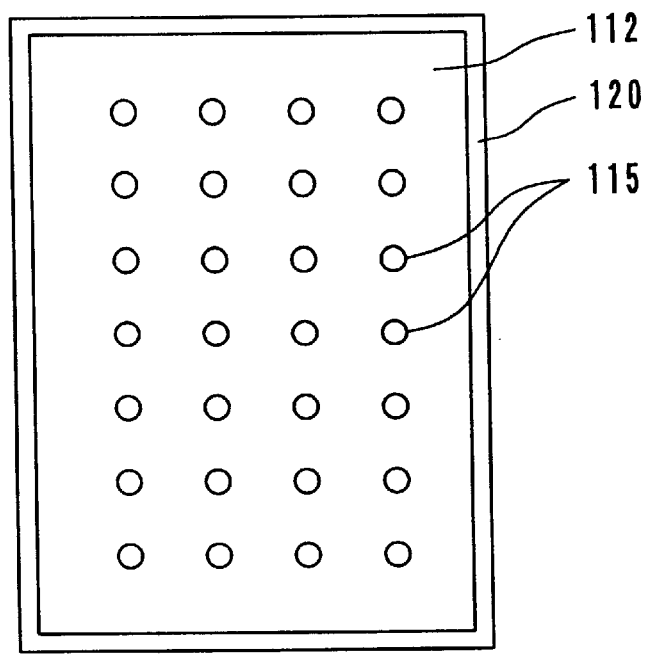
FIG. 2 is a plan view of a film type substrate of the liquid crystal display on which resin nodules and a sealant are formed.
Figure 3:
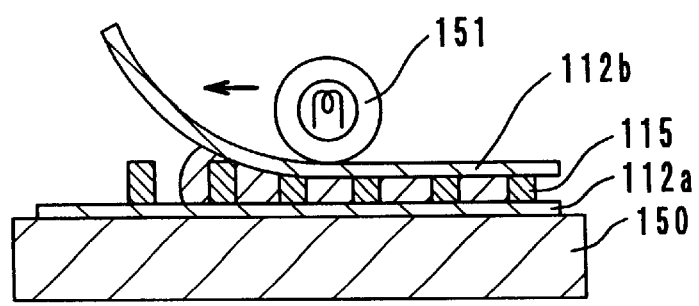
FIG. 3 is an illustration which shows a manufacturing process of the liquid crystal display.

The columnar nodules 115 are formed by a conventional printing method. As FIG. 2 shows, the material is printed into dots by use of a pattern. The size of the sections, the arrangement pitch and the shape (cylinders, drums, square poles, etc.) of the nodules are determined depending on the size of the liquid crystal display 100 and the image resolution. It is preferred to arrange the columnar nodules 115 among the electrodes 113 so that the transmittance will be higher.

The spacers 117 are preferably particles of a rigid material which are not deformed by heat and/or pressure during the fabrication of the display. For example, inorganic materials such as fine particles of glass fiber, balls of glass silicate, aluminum powder, etc., and particles of organic synthetic materials such as divinyl benzene bridged polymer, polystyrene bridged polymer, etc. are usable.

Thus, the rigid spacers 117 are provided between two substrates 112 to keep a specified gap in-between, and the resin nodules 115 made of a material mainly containing thermoplastic polymer are arranged in a specified pattern within the displaying area to support and bond the substrates 112. In the structure, the substrates 112 are entirely supported firmly, and alignment unevenness of the liquid crystal and occurrence of bubbles in the liquid crystal under low temperature can be prevented. The spacers 117 are not indispensable.

An exemplary method of producing the liquid crystal display 100 is briefly described.

On each of two transparent substrates, a plurality of transparent electrodes are formed. The transparent electrodes are formed by sputtering an ITO film and by patterning the ITO film by photolithography.

Next, transparent insulating layers and alignment controlling layers are formed on the transparent electrodes of the respective substrates. The insulating layers and the alignment controlling layers are formed of an inorganic material, e.g., silicon oxide or an organic material, e.g., polyimide resin by a conventional method such as sputtering, spin coating, roll coating or the like. The alignment controlling layers are not subjected to a rubbing treatment. Although the function of such alignment controlling layers is not clear, it is considered that alignment controlling layers provide liquid crystal molecules with an anchoring effect more or less, which results in preventing the liquid crystal display from changing in characteristics as time goes by. Also, a coloring agent may be added to these layers so that these layers will also function as color filters. Thereby, the color purity and the contrast can be improved.

On one of the substrates which have obtained the transparent electrodes, the insulating layers and the alignment controlling layers in this way, columnar nodules are formed on the surface with electrodes thereon. For the columnar nodules, paste of a resin material which is prepared by dissolving resin in a solvent is used. A printing method in which the resin paste is extruded by a squeegee via a screen, a metal mask or the like on the substrate placed on a planar stage, a dispenser method or an ink jet method in which the resin material is ejected onto the substrate from the end of a nozzle, and a transfer method in which the resin material is supplied to a plate or a roller and thereafter transferred onto the substrate can be adopted to form the resin nodules. The resin nodules, when they are formed, preferably have a height larger than the desired thickness of the display layer.

On the electrode surface of the other substrate, a sealant made of ultraviolet setting resin, thermosetting resin or the like is provided. The sealant is formed into an endless ring along the periphery of the substrate. To form the sealant, a dispenser method or an ink jet method in which the resin material is ejected from the end of a nozzle onto the substrate, a printing method using a screen, a metal mask or the like, and a transfer method in which the resin material is supplied to a plate or a roller and thereafter transferred onto the substrate can be adopted. Further, on at least one of the substrates, spacers are dispersed by a conventional method.

These two substrates are laminated together with the respective surfaces with electrodes thereon facing each other, and the laminate of substrates is heated while being pressed from both sides. The application of heat and pressure can be carried out, for example, in the way illustrated by FIG. 3 The substrate 112a with the columnar nodules 115 thereon is placed on a plate 150, and the other substrate 112b is placed on the substrate 112a. A heating/pressing roller 151 rolls over the substrate 112b from an end while heating and pressing the substrates 112a and 112b. That is, while the substrates 112a and 112b are passing between the roller 151 and the plate 150, the substrates 112a and 112b are pressed and heated and thereby laminated together. In this way, even when elastic flexible substrates such as film type substrates are used, it is possible to fabricate a cell accurately. If the columnar nodules are made of thermoplastic polymer, the columnar nodules are softened by heat and hardened by cooling, whereby the substrates can be bonded together by the columnar nodules. If the sealant is made of thermosetting resin, the sealant can be hardened by the heat during this laminating process.

In the laminating process, a liquid crystal material is dropped on one of the substrates, and the liquid crystal material is filled between the substrates while the substrates are being laminated together. The liquid crystal material contains spacers, and the material is dropped on the electrode surface of at least one of the substrates.

The liquid crystal material is dropped on the substrates at an end, and the liquid crystal material is spread over to the other end while the roller is rolling over the substrates to laminate the substrates together. In this way, the liquid crystal material is filled in the whole area of the space between the substrates. By adopting this laminating method, it is possible to suppress intake of bubbles into the liquid crystal material in the laminating process.

Thereafter, the application of pressure to the substrates is continued until the temperature of the substrates decreases to at least the softening point of the resin material of the columnar nodules. Further, if the sealant is made of photo-setting resin, radiation is carried out to harden the sealant.

In the same procedure, the blue display cell, the green display cell and the red display cell are fabricated while using different liquid crystal materials which selectively reflect light of mutually different wavelengths. These three cells are laminated and bonded together, and a light absorbing layer is provided on the bottom of the lowermost cell. Finally, a full-color liquid crystal display is fabricated.

Figure 4:
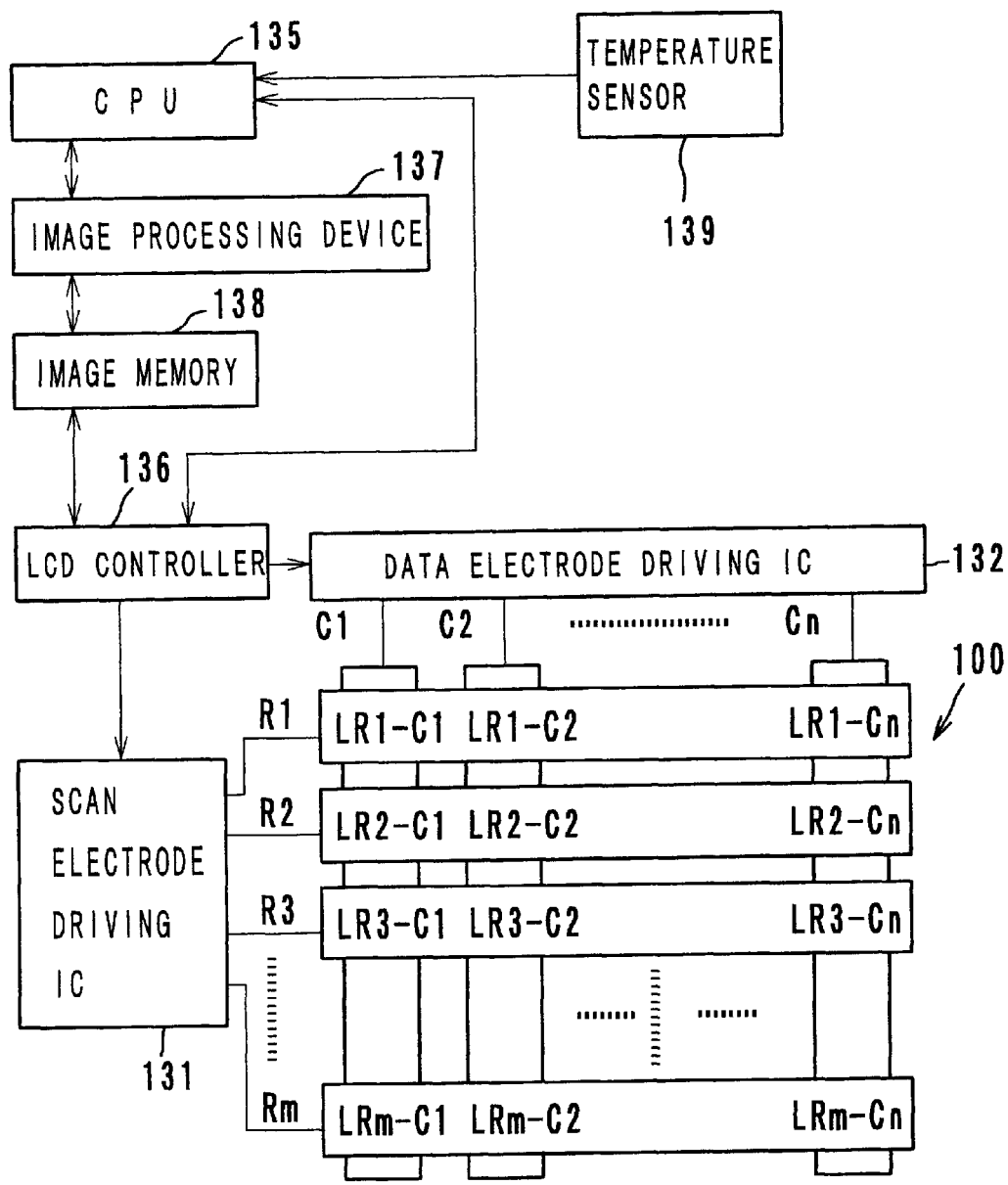
FIG. 4 is a block diagram which shows a driving circuit of the liquid crystal display.

As FIG. 4 shows, the pixels of the liquid crystal display 100 are structured into a matrix which is composed of a plurality of scan electrodes R1, R2, . . . Rm and a plurality of data electrodes C1, C2, . . . Cn (n, m: natural numbers). The scan electrodes R1, R2 . . . Rm are connected to output terminals of a scan electrode driving IC 131, and the data electrodes C1, C2, . . . Cn are connected to output terminals of a data electrode driving IC 132.

The scan electrode driving IC 131 outputs a selective signal to a specified one of the scan electrodes R1, R2, . . . Rm while outputting a non-selective signal to the other scan electrodes R1, R2, . . . Rm. The scan electrode driving IC 131 outputs the selective signal to the scan electrodes R1, R2, . . . Rm one by one at specified time intervals. In the meantime, the data electrode driving IC 132 outputs signals to the data electrodes C1, C2, . . . Cn simultaneously in accordance with image data to write the pixels on the selected scan electrode. For example, while a scan electrode Ra (a≦m, a: natural number) is selected, the pixels LRa-C1 through LRa-Cn on the intersections of the scan electrode Ra and the data electrodes C1, C2, . . . Cn are written simultaneously. In each pixel, the voltage difference between the scan electrode and the data electrode is a voltage for writing the pixel (writing voltage), and each pixel is written in accordance with this writing voltage.

The driving circuit of the liquid crystal display 100 comprises a CPU 135, an LCD controller 136, an image processing device 137, and image memory 138 and the driving ICs (drivers) 131 and 132. In accordance with image data stored in the image memory 138, the LCD controller 136 controls the driving ICs 131 and 132. Thereby, voltages are applied between the scan electrodes and the data electrodes of the liquid crystal display 100 serially, so that an image is written on the liquid crystal display 100. A temperature sensor 139 is connected to the CPU 135 and detects the temperature in the circumstances. The structures of the driving ICs 131 and 132 will be described in detail later.

Suppose the threshold voltage (first threshold voltage) to untwist liquid crystal which exhibits a cholesteric phase to be Vth1, when the first threshold voltage Vth1 is applied to the liquid crystal for a sufficiently long time and thereafter, the voltage is lowered under a second threshold voltage Vth2 which is lower than Vth1, the liquid crystal comes to a planar state. When a voltage which is higher than Vth2 and lower than Vth1 is applied to the liquid crystal for a sufficiently long time, the liquid crystal comes to a focal-conic state. These two states are maintained even after stoppage of application of voltage. Also, by applying voltages between Vth1 and Vth2 to the liquid crystal, it is possible to display intermediate tones, that is, gray levels.

Further, when writing part of the liquid crystal display 100, only specified scan electrodes including the part shall be selected. In this way, writing is carried out on only necessary part of the liquid crystal display, which requires a shorter time.

Writing can be carried out in the above-described way. If an image is displayed on the liquid crystal display, preferably, all the pixels are reset to the same state before writing a new image so that the newly written image will not be influenced by the previously displayed image. The reset of all the pixels may be carried out simultaneously or may be serially by scan electrode. It is known that it takes a comparatively long time to reset a pixel to a focal-conic state or to be sufficiently transparent. Therefore, resetting all the pixels to a focal-conic state simultaneously is preferable to resetting the pixels by scan electrode because it takes a shorter time.

When writing is to be carried out on part of the liquid crystal display, the reset may be carried out by scan electrode, or the pixels on specified scan electrodes including the desired part may be reset at one time.

The above-described liquid crystal display 100 has resin columnar nodules in the displaying area. This structure permits fabrication of a liquid crystal display which is light and which is excellent in display performance by use of film type substrates. This structure also permits easy fabrication of a large-scale liquid crystal display and fabrication of a liquid crystal display which requires a relatively low driving voltage, which is strong against shock and which has various other advantages.

However, the liquid crystal display with a memory effect is not necessarily of this structure. It is possible to structure the liquid crystal display layer to be a polymer-dispersed type composite layer in which a three-dimensional polymer net is formed in liquid crystal. Also, as the liquid crystal with a memory effect, not only bistable liquid crystal which exhibits a cholesteric phase but also other kinds of liquid crystal with a memory effect, for example, ferroelectric polymer liquid crystal and ferroelectric liquid crystal can be used.

First Driving Principle; See FIGS. 5 and 6

First, a first driving principle of a method according to the present invention is described. Although specific examples which use alternated pulse waveforms will be described in the following paragraphs, the driving method according to the present invention does not necessarily use such waveforms. As FIG. 5 shows, the driving method generally comprises a reset step Tr, a selection step Ts, an evolution step Te and a display step Td.

In the upper section of FIG. 5, a driving waveform which is applied to liquid crystal (LCD1) corresponding to a pixel is shown, and in the lower section, the state of the liquid crystal in each of the steps is schematically illustrated. As FIG. 5 shows, in the example, the reset step Tr is twice as long as that of the selection step Ts, and the evolution step Te is thrice as long as that of the selection step Ts. Accordingly, for writing of one line, it takes a time which is equal to six times as long as the selection step Ts.

In the reset step Tr, first, a voltage with an absolute value of Vr is applied to the pixels on a scanning line to be written, and thereby, the pixels on the scanning line are reset to a homeotropic state (see "a" in FIG. 5).

The selection step Ts is composed of three steps (a pre-selection step Ts1, a selection pulse application step Ts2 and a post-selection step Ts3). In the pre-selection step Ts1, the voltage applied to the pixels on the scanning line to be written is made zero. Thereby, the liquid crystal of the pixels on the scanning line are untwisted a little (to come to a first transient state, see "b" in FIG. 5). Next, in the selection pulse application step Ts2, a selection pulse in accordance with the image to be displayed is applied to each of the pixels on the scanning line. In the selection pulse application step Ts2, the pulse waveform applied to pixels which are desired to finally come to a planar state is different from the pulse waveform applied to pixels which are desired to finally come to a focal-conic state. Therefore, the steps after the selection pulse application step Ts2 will be described with respect to a pixel which is desired to finally come to a planar state and with respect to a pixel which is desired to finally come to a focal-conic state separately.

In selecting a planar state as the final state of a pixel, in the selection pulse application step Ts2, a selection pulse with an absolute value of Vse1 is applied to the pixel, and thereby, the liquid crystal of the pixel comes to a homeotropic state again (see "c1" in FIG. 5). Thereafter, in the post-selection step Ts3, the voltage applied to the pixel is made zero, and thereby, the liquid crystal is untwisted a little (see "d1" in FIG. 5). This state is almost equal to the first transition state.

In the evolution step Te, first, a pulse voltage with an absolute value of Ve is applied to the pixels on the scanning line to be written. The liquid crystal of the pixel, which has been untwisted a little in the selection step Ts, is completely untwisted by the application of the pulse voltage Ve, and the liquid crystal comes to a homeotropic state (see "e1" in FIG. 5).

In the display step Td, the voltage applied to the liquid crystal section of the pixel is made zero. Thereby, the liquid crystal in a homeotropic state comes to a planar state (see "f1" in FIG. 5). In this way, selection/evolution of a pixel to a planar state is carried out.

In selecting a focal-conic state as the final state of a pixel, in the selection pulse application step Ts2, the voltage applied to the liquid crystal section of the pixel is made zero, and thereby, the liquid crystal is untwisted further (comes to a second transient state, see "c2" in FIG. 5). In the post-selection step Ts3, as in the case of selecting a planar state, the voltage applied to the liquid crystal section is made zero. Thereby, the liquid crystal is untwisted and comes to a state in which the helical pitch is widened approximately double (comes to a third transient state, see "d2" in FIG. 5). This state is considered to be almost equal to the transient planar state taught by the above-mentioned U.S. Pat. No. 5,748,277.

Next, in the evolution step Te, as in the case of selecting a planar state, a pulse voltage with an absolute value of Ve is applied to the pixels on the scanning line to be written. The liquid crystal of the pixel, which has been untwisted a little in the selection step Ts, comes to a focal-conic state by the application of the pulse voltage Ve (comes to a fourth transient state, see "e2" in FIG. 5).

In the display step Td, as in the case of selecting a planar state, the voltage applied to the liquid crystal is made zero. The liquid crystal in a focal-conic state stays in the focal-conic state even after the voltage is made zero. In this way, selection/evolution of a pixel to a focal-conic state is carried out (see "f2" in FIG. 5).

Thus, depending on the selection pulse applied to liquid crystal in the middle short period of the selection step Ts, that is, in the selection pulse application step Ts2, the final state of the pixel is selected. Further, by adjusting the pulse width of the selection pulse and more specifically by changing the form of the pulse applied to the data electrode in accordance with image data, intermediate tones can be displayed.

Making the voltage applied to the liquid crystal zero in the pre-selection step Ts1 and in the post-selection step Ts3, that is, setting break times permits use of a simple driver structure as will be described later, which contributes to reduction of cost. Needless to say, the voltage is not necessarily made zero but may be set to a voltage which is almost zero and is not actually effective. A typical example is a case in which a very weak voltage is applied because of an error in fabrication although application of 0 volt was designed. In short, the voltage may be substantially zero.

Figure 6:
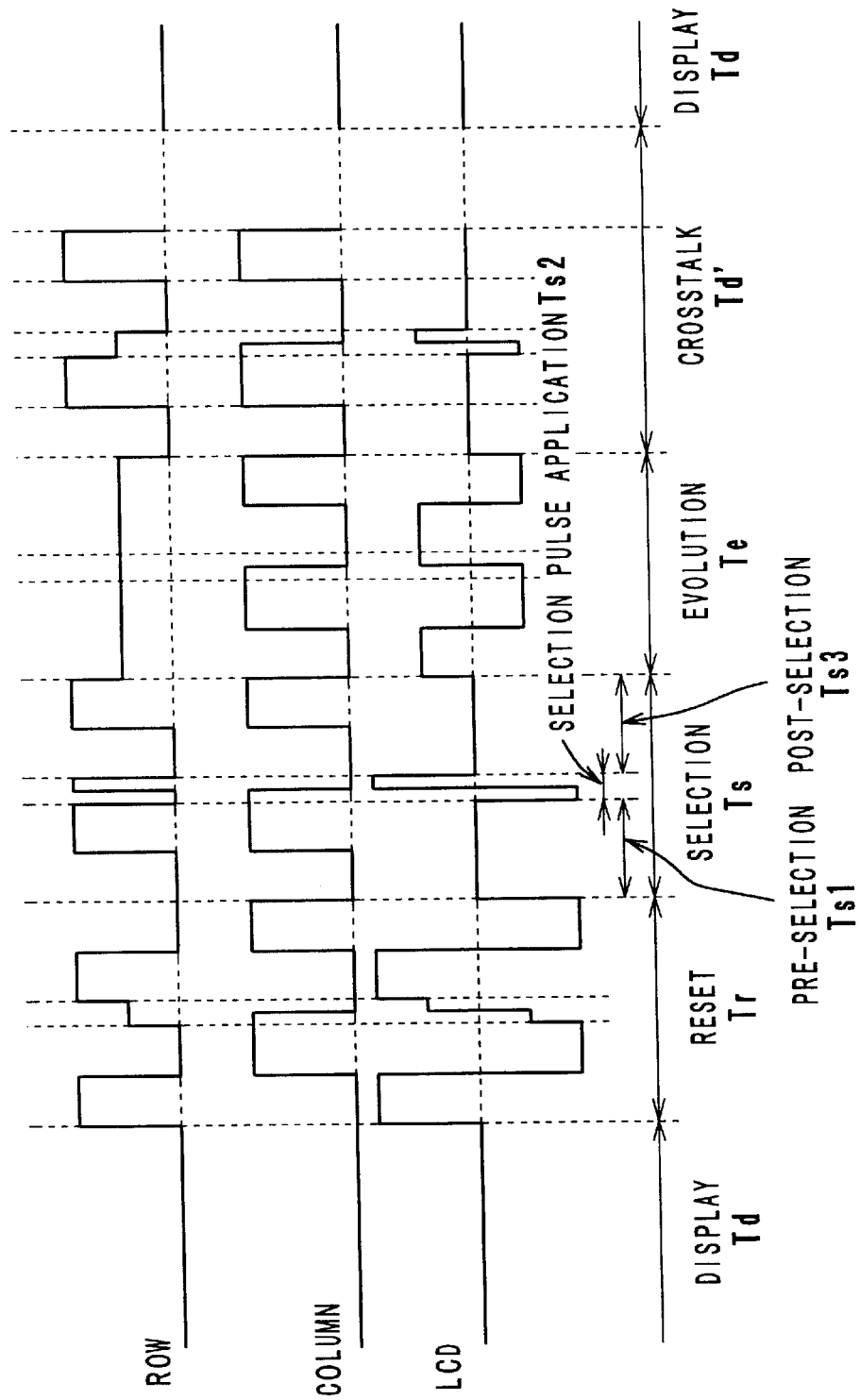
FIG. 6 is a chart which shows driving waveforms based on the first principle.

FIG. 6 shows the waveform of a voltage which is applied to one of a plurality of pixels arranged in a matrix and exemplary waveforms applied to the scan electrode (row) and the data electrode (column) to obtain the voltage waveform acting on the pixel. On the contrary, in FIG. 6, "ROW" means a scan electrode, "COLUMN" means a data electrode, and "LCD" means the liquid crystal corresponding to the pixel which is the intersection between the ROW and the COLUMN.

As FIG. 6 shows, in the matrix driving method, after the evolution step Te of a scan electrode, data are written on the pixels on another scan electrode, and the pixels on which writing has been done are influenced by a specified voltage as a crosstalk voltage through the data electrodes. The step in which the crosstalk voltage is applied is referred to as a crosstalk step Td'. The pulse width and the energy of the crosstalk voltage are too narrow and too small to influence the liquid crystal.

All the scan electrodes have been selected, and when the evolution step Te of the last selected scan electrode is over, the other scan electrodes has gone through the crosstalk step Td'. Then, the voltages applied to all the scan electrodes and the data electrodes are made zero, and the whole liquid crystal comes to the display step Td. This state is maintained until the next writing is started.

In FIG. 6, for simplification, the lengths of the reset step Tr, the selection step Ts, the evolution step Te and the crosstalk step Td' are shown to be equal to one another. For the same reason, the signal sent to the COLUMN is shown as a waveform to select all the pixels to come to a planar state.

In the following, specific examples of a matrix driving waveform according to the first driving principle is described. In the following first through fourth examples, "ROW1", "ROW2" and "ROW3" mean three scan electrodes which are serially selected, "COLUMN" means a data electrode which crosses the three scan electrodes (ROWS 1–3), and "LCD1", "LCD2" and "LCD3" mean liquid crystal corresponding to the pixels on the intersections between the ROWS 1–3 and the COLUMN.

First Example of Matrix Driving; See FIG. 7

According to the above-described driving method, there are a reset step, a selection step, an evolution step and a crosstalk step. Further, the selection step has a pre-selection step, a selection pulse application step and a post-selection step, and a selection pulse is applied to the pixel only in part of the selection step.

The form of the selection pulse must be changed according to image data to be written on the pixel, and selection pulses of different forms in accordance with image data must be applied to the column. On the other hand, at the pre-selection step and at the post-selection step of every pixel, the voltage applied thereto is zero, and a combination of specified pulse waveforms to be applied to the rows and the columns to cause application of 0 volt to the pixels can be used. In the first example shown by FIG. 7, by using this, reset, evolution and display are carried out simultaneously on the pixels on a plurality of scan electrodes.

For example, while the LCD 2 is in the pre-selection step, pulses of a voltage +V1 which are out of phase with each other are applied to the ROW2 and ROW3, and a voltage +V1/2 is applied to the ROW1. At this time, if a pulse of +V1 which is out of phase with the pulse applied to the ROW3 is applied to the COLUMN, a reset pulse of ±Vr= ±V1 is applied to the LCD3, 0 volt is applied to the LCD2, and an evolution pulse ±Ve=±V1/2 is applied to the LCD1.

While the LCD2 is in the selection pulse application step, a data pulse of a form in accordance with image data (of a voltage +V1) is applied to the COLUMN. Accordingly, a voltage of +V1/2 is applied to the ROW1 and the ROW2 so that a voltage of ±V1/2 can be applied to the LCD1 and the LCD3. A pulse of a voltage +V1 is applied to the ROW2, so that the voltage difference (±V1 or 0) between the voltage applied to the ROW2 and the data pulse applied to the COLUMN is applied to the LCD2 as a selection pulse of a voltage ±Vse1. By changing the form of the data pulse applied to the COLUMN, the pulse width of the selection pulse can be changed.

In the post-selection step, the same process as in the pre-selection step is carried out. Specifically, pulses which are of a voltage +V1 but are out of phase are applied to the ROW2 and the ROW3, and a pulse of a voltage +V1/2 is applied to the ROW1. At this time, a pulse of a voltage +V1 which is out of phase with the pulse applied to the ROW3 is applied to the COLUMN. Thereby, a reset pulse of ±Vr=±V1 is applied to the LCD3, 0 volt is applied to the LCD2, and an evolution pulse ±Ve=±V1/2 is applied to the LCD1.

In the steps other than the reset step, the selection step and the evolution step, pulses in phase with the data pulses applied to the data electrode in the pre-selection step and in the post-selection step are applied, and while any of the other scan electrodes is in the selection pulse application step, a pulse of a voltage +V1/2 is applied. Thereby, to the part of the liquid crystal corresponding to this pixel, a crosstalk voltage ±V1/2 with the same pulse width as that of the selection pulse is applied. The pulse width of this crosstalk voltage is too narrow to change the state of the liquid crystal.

By applying the above-described pulses to the scan electrodes repeatedly, an image is displayed on the liquid crystal display. The scan electrodes may be selected one after another or may be selected one by one in an arbitrary order. Also, because it is possible to apply the reset pulse, the selection pulse and the evolution pulse to any desired scan electrodes, partial writing of the liquid crystal display is possible.

In the first example, the driving IC for the rows (scan electrodes) has three output levels (V1, V1/2 and GND), and the driving IC for the columns (data electrodes) has two output levels (V1 and GND).

Exemplary Driving ICs for the First Example of Matrix Driving; See FIGS. 8 and 9

Figure 7:
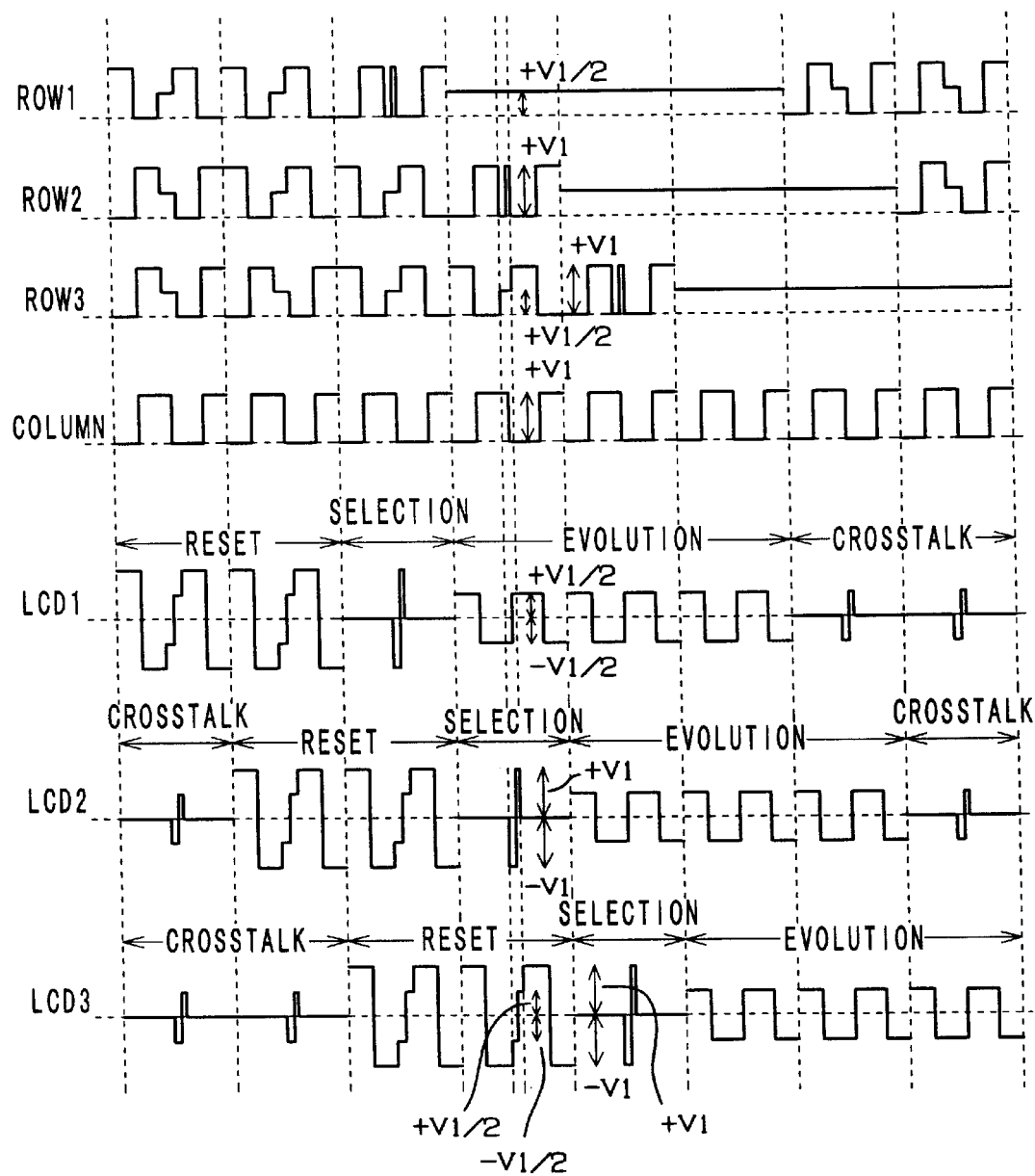
FIG. 7 is a chart which shows driving waveforms in a first example.
Figure 8:
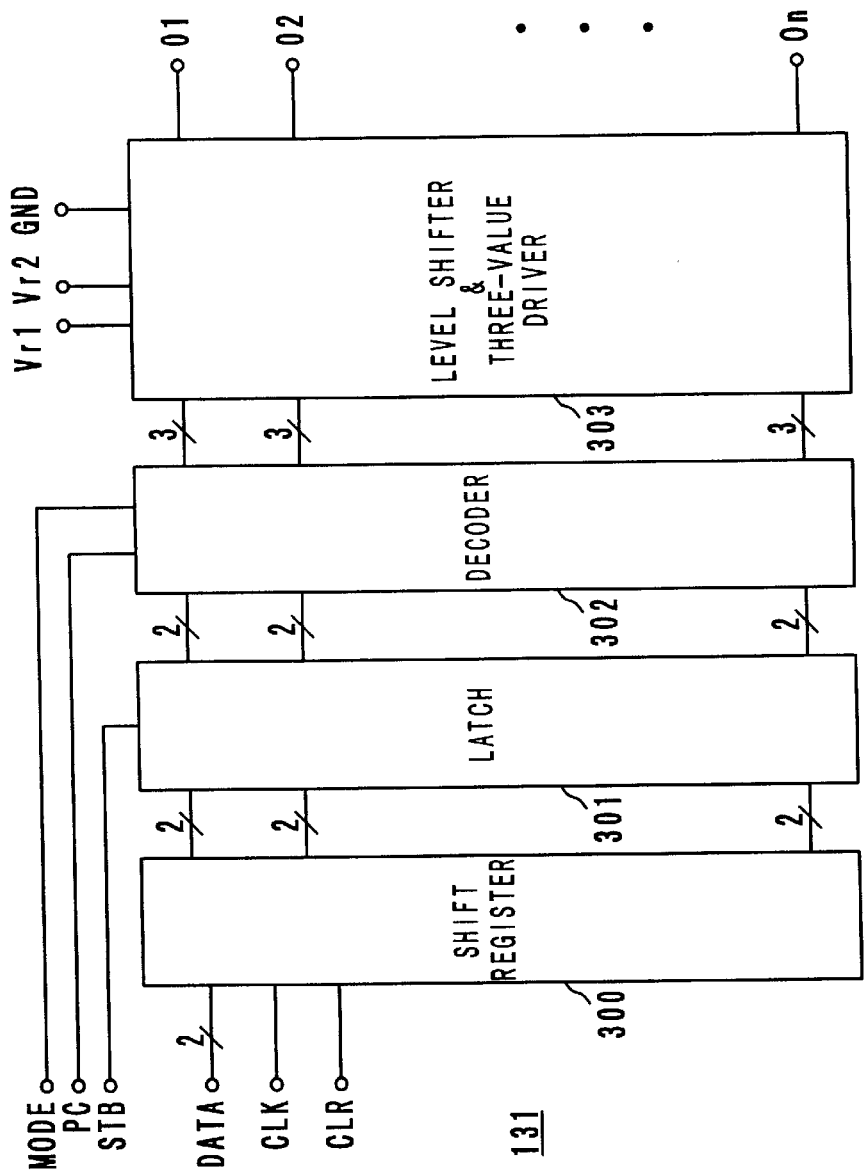
FIG. 8 is a block diagram which shows a scan electrode driving IC used in the first example.

FIG. 8 shows the internal circuit of the scan electrode driving IC 131 which outputs the driving waveform shown in FIG. 7. The scan electrode driving IC 131 comprises a shift register 300, a latch 301, a decoder 302 and a level shifter/three-value driver 303 with a high withstand voltage. In the scan electrode driving IC 131, a mode switch signal MODE and a polarity conversion signal PC are inputted to the decoder 302. A strobe signal STB is inputted to the latch 301. A data signal DATA, a shift clock signal CLK and a clear signal CLR are inputted to the shift register 300. These signals are sent from the LCD controller 136. Signals which will be described later are sent from the LCD controller 136 unless there is a particular description.

Operation of the driving IC 131 is described. In response to the two-bit data signal DATA and the shift clock signal CLK, the shift register 300 sets two-bit data therein. Next, in response to the strobe signal STB, the data set in the shift register 300 is latched in the latch 301. In response to the latched two-bit data signal DATA, the polarity conversion signal PC and the mode switch signal MODE, the decoder 302 decodes the two-bit data signal DATA and drives the level shifter/three-value driver 303. The level shifter/three-value driver 303 outputs a voltage Vr1, Vr2 or GND.

Table 1 below is a truth table of the scan electrode driving IC 131. As is apparent from Table 1, in accordance with the combination of the two-bit data signals DATA1 and DATA2, the polarity conversion signal PC and the mode switch signals MODE1 and MODE2, one of the voltages Vr1, Vr2 and GND is outputted. By inputting Vr1=V1 and Vr2=V1/2 to the three-value driver 303, the waveforms applied to the rows shown in FIG. 7 can be outputted.

TABLE 1

| | MODE 1 | | | | MODE 2 | | | |
|---|---|---|---|---|---|---|---|---|
| Step | DATA 1 | DATA 2 | PC | Output | DATA 1 | DATA 2 | PC | Output |
| Reset | 1 | 0 | 0 | Vr1 | 1 | 0 | 0 | Vr2 |
| Evolution | 0 | 1 | 0 | Vr2 | 0 | 1 | 0 | Vr2 |
| Display | 0 | 0 | 0 | GND | 0 | 0 | 0 | Vr2 |

TABLE 1-continued

|  | MODE 1 | | | | MODE 2 | | | |
| --- | --- | --- | --- | --- | --- | --- | --- | --- |
| Step | DATA 1 | DATA 2 | PC | Output | DATA 1 | DATA 2 | PC | Output |
| Selection | 1 | 1 | 0 | GND | 1 | 1 | 0 | GND |
| Reset | 1 | 0 | 1 | GND | 1 | 0 | 1 | Vr2 |
| Evolution | 0 | 1 | 1 | Vr2 | 0 | 1 | 1 | Vr2 |
| Display | 0 | 0 | 1 | Vr1 | 0 | 0 | 1 | Vr2 |
| Selection | 1 | 1 | 1 | Vr1 | 1 | 1 | 1 | Vr1 |

Figure 9:
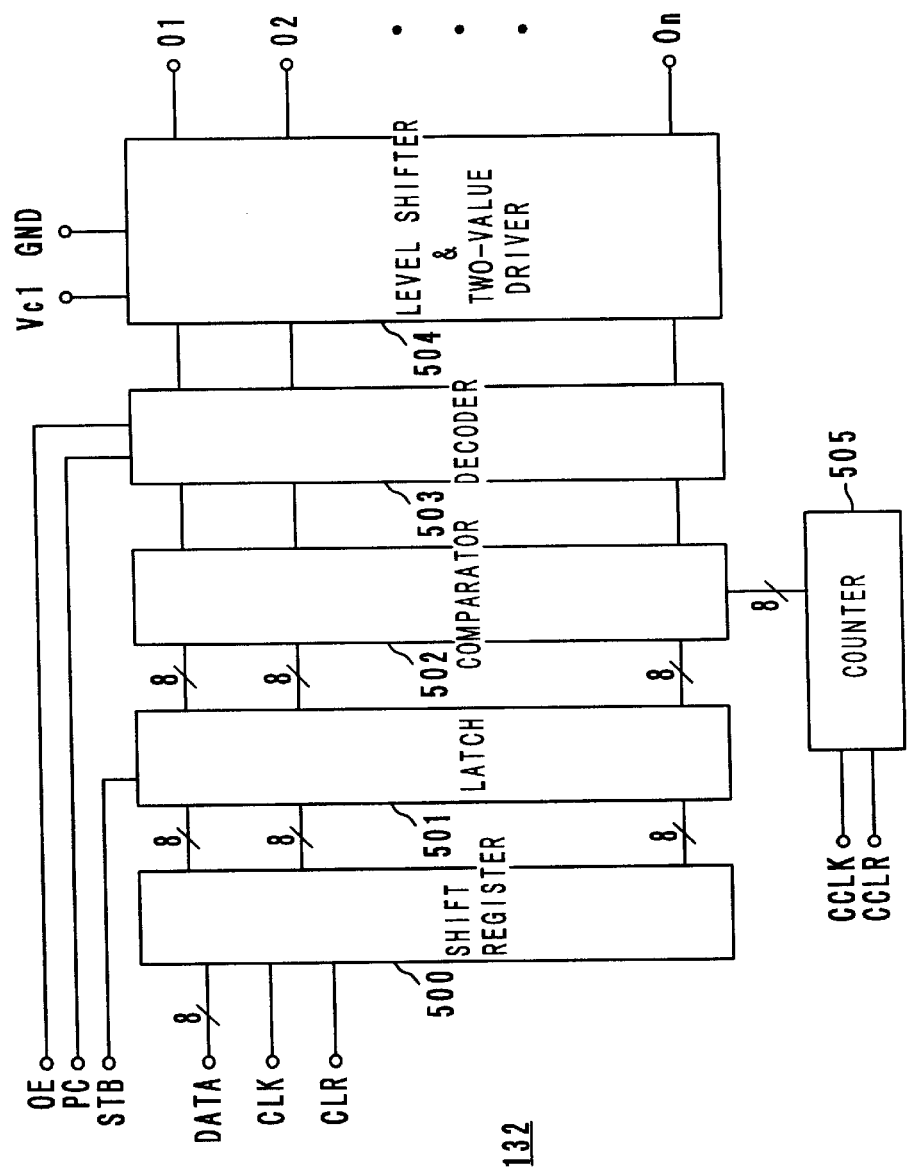
FIG. 9 is a block diagram which shows a data electrode driving IC used in the first example.

FIG. 9 shows the internal circuit of the data electrode driving IC 132 which outputs the waveform shown in FIG. 7. The data electrode driving IC 132 comprises a shift register 500, a latch 501, a comparator 502, a decoder 503, a level shifter/driver 504 with a high withstand voltage and a counter 505. In the driving IC 132, an output evasion signal OE and a polarity conversion signal PC are inputted to the decoder 503. A strobe signal STB is inputted to the latch 501. An eight-bit data signal DATA, a shift clock signal CLK and a clear signal CLR are inputted to the shift register 500. A clock signal CCLK and a clear signal CCLR are inputted to the counter 505.

Operation of the data electrode driving IC 132 is described. In response to the eight-bit data signal DATA and the shift clock signal CLK, the shift register 500 sets eight-bit data therein. Thereafter, in response to the strobe signal STB, the data set in the shift register is latched in the latch 501. Here, by using the clock signal CCLK sent to the counter 505, the output of the eight-bit data is counted. The comparator 502 compares the output of the latch 501 with the output of the counter 505, and while the output of the latch 501 is larger, the comparator 502 outputs a high-level signal. The counter 505 counts further, and when the output of the latch 501 becomes smaller, the comparator 502 outputs a low-level signal. In accordance with the output of the comparator 502, the output evasion signal QE and the polarity conversion signal PC, the decoder 503 outputs a signal to drive the level shifter/driver 504.

Table 2 below is a truth table of the data electrode driving IC 132. As is apparent from Table 2, in accordance with the combination of the output of the comparator 502, the output evasion signal OE and the polarity conversion signal PC, a voltage Vc1 or GRD is outputted. By inputting Vc1=V1, the waveform applied to the column shown in FIG. 7 can be outputted.

TABLE 2

| Output of Comparator | OE | PC | Output |
| --- | --- | --- | --- |
| 1 | 0 | 0 | Vc1 |
| 1 | 0 | 1 | GND |
| 0 | 0 | 0 | GND |
| 0 | 0 | 1 | Vc1 |
| X | 1 | 0 | All GND |
| X | 1 | 1 | All Vc1 |

The mark "X" means that the output may be either 0 or 1.

Thus, because a three-value driver and a two-value driver are used for the scan electrodes and for the data electrodes respectively, the cost for the driving ICs can be reduced.

Second Example of Matrix Driving; See FIG. 10

Figure 10:
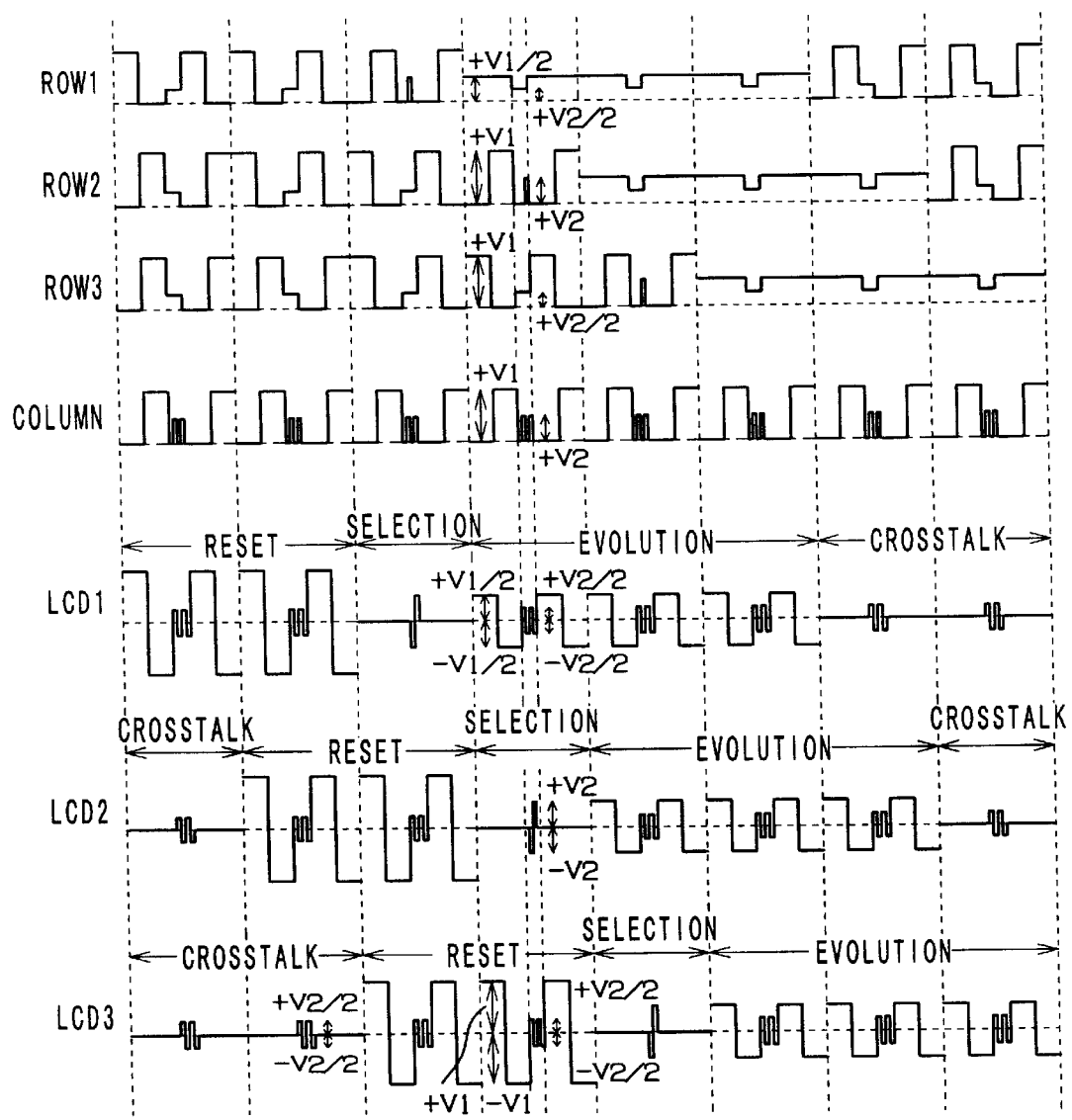
FIG. 10 is a chart which shows driving waveforms in a second example.

In the above-described first example, the voltage of the selection pulse Vse1 which is applied in the selection step is equal to the voltage of the reset pulse Vp=V1. In the second example, however, the voltage of the selection pulse Vse1 is V2 which is different from (lower than) the voltage V1. Setting the voltage of the selection pulse lower than the voltage of the reset pulse reduces the energy loss and facilitates control for display of intermediate tones. FIG. 10 shows driving waveforms according to the second example.

For example, while the LCD2 is in the pre-selection step, pulses which are of a voltage +V1 but are out of phase are applied to the ROW2 and the ROW3, and a voltage +V1/2 is applied to the ROWI. At this time, if a pulse which is of a voltage +V1 and is out of phase with the pulse applied to the ROW 3 is applied to the COLUMN, a reset pulse ±Vr=±V1 is applied to the LCD3, 0 volt is applied to the LCD2, and an evolution pulse ±Ve=±V1/2 is applied to the LCD1.

While the LCD2 is in the selection pulse application step, a data pulse of a form in accordance with image data (of a voltage V2) is applied to the COLUMN. At this time, pulses of a voltage +V2/2 are applied to the ROW1 and the ROW3 so that a voltage ±V2/2 will be applied to the LCD1 and LCD3. The voltage +V2 is applied to the ROW 2, so that the voltage difference between the data pulse applied to the COLUMN and the voltage ±V2 (±V2 or 0) is applied to the LCD2 as a selection pulse ±Vse1. By changing the form of the data pulse applied to the COLUMN, the pulse width of the selection pulse can be changed.

In the post-selection step, application of the voltages to the ROWS 1–3 and the COLUMN is carried out in the same way as in the pre-selection step.

In the steps other than the reset step, the selection step and the evolution step, pulses in phase with the data pulse applied to the data electrode in the pre-selection step and in the post-selection step are applied, and while any of the other scan electrodes is in the selection pulse application step, a pulse of a voltage +V2/2 is applied. Thereby, to the part of the liquid crystal corresponding to this pixel, a crosstalk voltage ±V2/2 with the same pulse width as that of the selection pulse is applied. The pulse width of this crosstalk voltage is too narrow to change the state of the liquid crystal.

By applying the above-described pulses to the scan electrodes repeatedly, an image can be displayed on the liquid crystal display. Of course, partial writing on the liquid crystal display is possible.

In the second example, the driving IC for the rows (scan electrodes) has five output levels (V1/2, V2, V2/2 and GND), and the driving IC for the columns (data electrodes) has three output levels (V1, V2 and GND).

Exemplary Driving ICs for Second Example of Matrix Driving; See FIGS. 11 and 12

Figure 11:
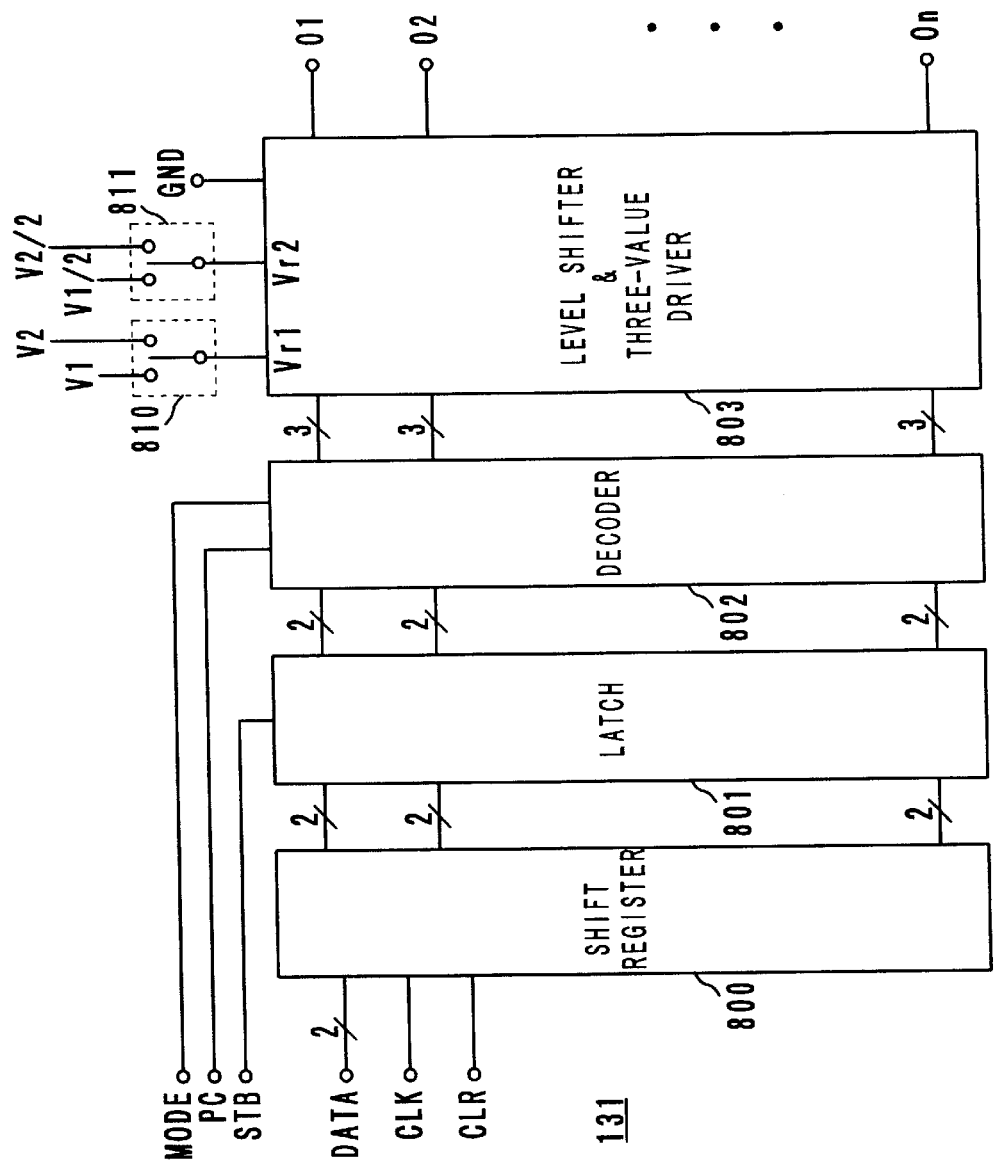
FIG. 11 is a block diagram which shows a scan electrode driving IC used in the second example.

FIG. 11 shows the internal circuit of the scan electrode driving IC 131 which outputs the waveforms shown in FIG. 10. The scan electrode driving IC 131 is basically of the same structure shown by FIG. 8, and further, a voltage switch circuit is provided so that the three-value driver can output five values. Specifically, the driving IC 131 comprises a shift register 800, a latch 801, a decoder 802, a level shifter/three-value driver 803 with a high withstand voltage and analog switches 810 and 811. In the driving IC 131, a mode switch signal MODE and a polarity conversion signal PC are inputted to the decoder 804. A strobe signal STB is inputted to the latch 801. A data signal DATA, a shift clock signal CLK and a clear signal CLR are inputted to the shift register 800.

Operation of the scan electrode driving IC 131 is described. In response to the two-bit data signal DATA and the shift clock signal CLK, the shift register 800 sets two-bit data therein. Next, in response to the strobe signal STB, the data set in the shift register 800 is latched in the latch 801. In response to the polarity conversion signal PC and the mode switch signal MODE, the decoder 802 decodes the latched two-bit data signal DATA and drives the level shifter/three-value driver 803. The level shifter/three-value driver 803 outputs either one of the voltages Vr1, Vr2 and GND.

Each of the voltages Vr1 and Vr2 are switchable between V1 and V2 and between V1/2 and V2/2 by the analog switches 810 and 811, respectively, based on a signal sent from the LCD controller 136. By carrying out this switch in the selection step, it becomes possible to set the selection pulse to V2.

Figure 12:
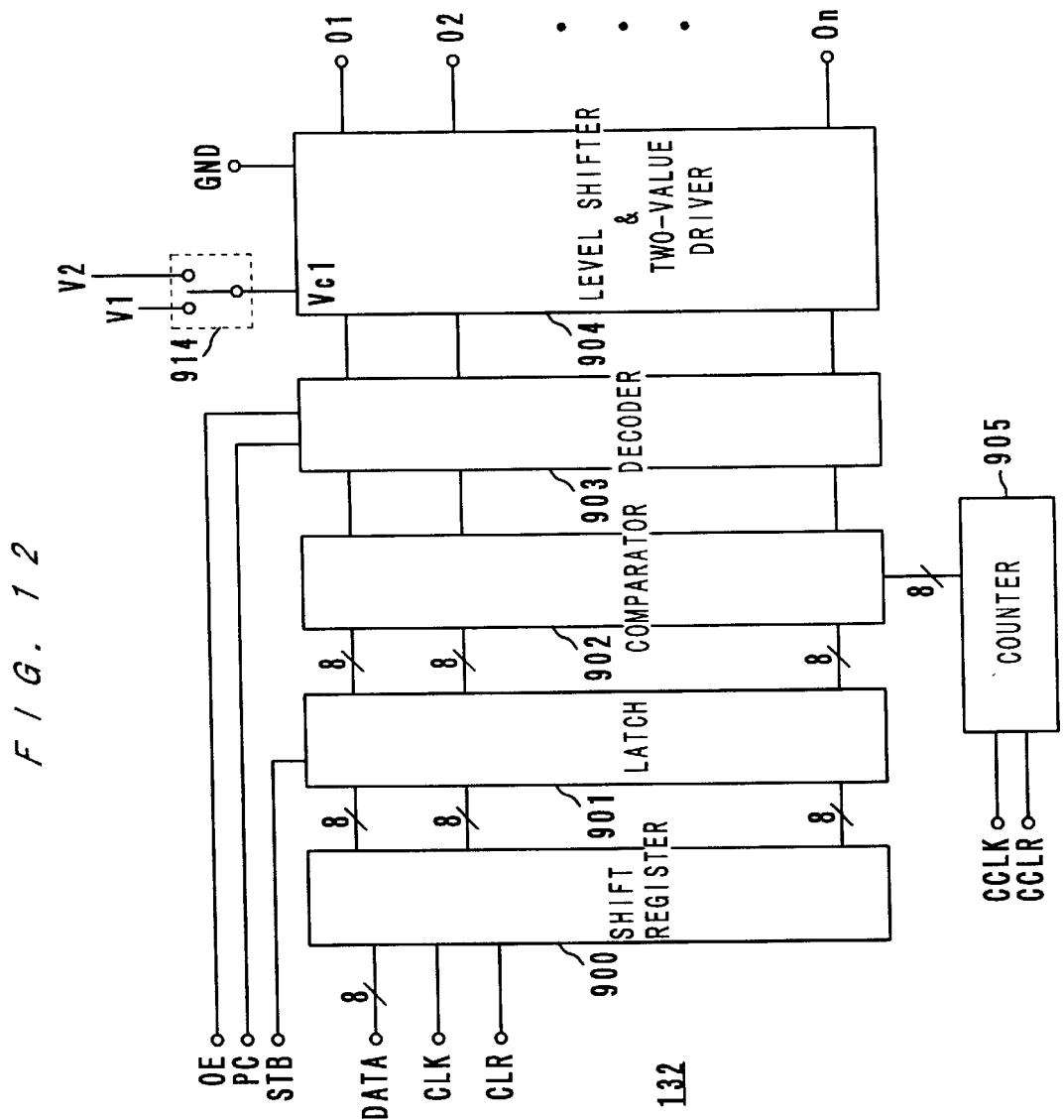
FIG. 12 is a block diagram which shows a data electrode driving IC used in the second example.

FIG. 12 shows the internal circuit of the data electrode driving IC 132 which outputs the waveform shown in FIG. 10. The data electrode driving IC 132 is basically of the same structure shown by FIG. 9. The driving IC 132 comprises a shift register 900, a latch 901, a comparator 902, a decoder 903, a level shifter/driver 904 with a high withstand voltage, a counter 905 and an analog switch 914. In the driving IC 132, an output evasion signal OE and a polarity conversion signal PC are inputted to the decoder 903. A strobe signal STB is inputted to the latch 901. An eight-bit data signal DATA, a shift clock signal CLK and a clear signal CLR are inputted to the shift register 900. A clock signal CCLK and a clear signal CCLR are inputted to the counter 905.

Operation of the data electrode driving IC 132 is described. Based on the eight-bit data signal DATA and the shift clock signal CLK inputted to the shift register 900, the shift register 900 sets eight-bit data therein. Next, in response to the strobe signal STB, the data set in the shift register 900 is latched in the latch 901. At this time, the counter 905 starts counting the output of the eight-bit data signal by using the clock signal CCLK. The comparator 902 compares the output of the latch 901 with the output of the counter 905. When the output of the latch 901 is larger, the comparator 902 outputs a high-level signal. The counter 905 counts further, and when the output of the latch 901 becomes smaller, the comparator 902 outputs a low-level signal. Based on the output of the comparator 902, the output evasion signal OE and the polarity conversion signal PC, the decoder 903 outputs a signal to drive the level shifter/driver 904.

The voltage Vc1 is switchable between V1 and V2 by the analog switch 914 based on a signal sent from the LCD controller 136. By carrying out this switch in the selection step, it is possible to set the selection pulse to V2.

Thus, by providing an analog switch which permits selection of a voltage from different voltages supplied from a plurality of power sources, outputs of three values or outputs of five values become possible merely by use of a two-value driver or a three-value driver. This prevents an increase in production cost.

Third Example of Matrix Driving; See FIG. 13

Figure 13:
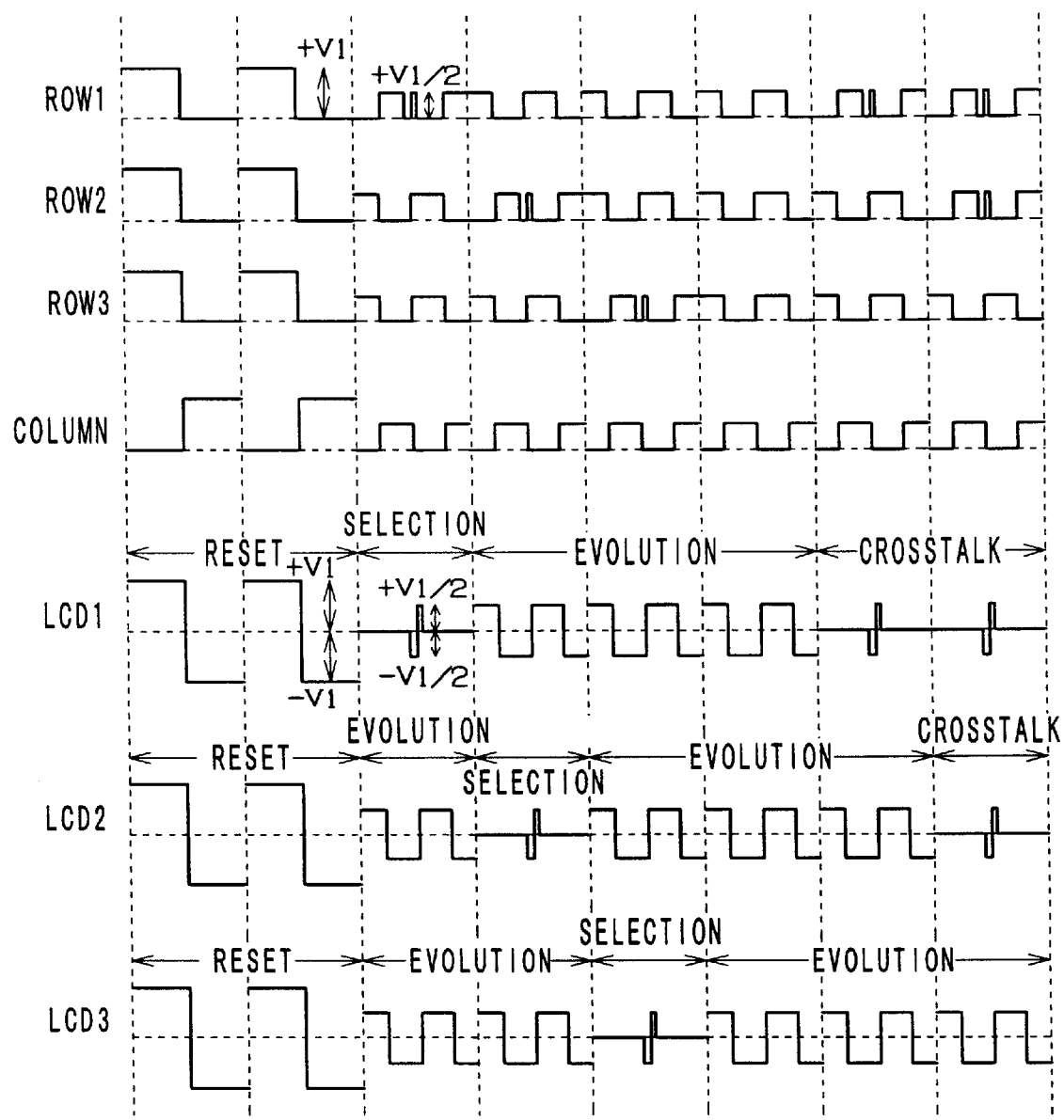
FIG. 13 is a chart which shows driving waveforms in a third example.

In the first and second examples, the scan electrodes are reset serially. The third example, however, adopts a total reset method in which all the scan electrodes in the area to be written are reset at one time. FIG. 13 shows driving waveforms in the third example. In this example, merely two-value drivers can be used for the scan electrode driving IC and for the data electrode driving IC by providing voltage switching means in each of the driving ICs.

First, all the screen is once reset. At this time, the reset pulses ±Vr outputted from the driving ICs are of a voltage V1. Because this voltage is applied to the entire screen simultaneously, the voltages supplied to the driving ICs are set to V1. Then, for serial selection of the scan electrodes, the voltages supplied to the driving ICs are switched to V1/2.

While the LCD2 is in the pre-selection step, pulses which are of a voltage +V1/2 and are in phase with each other are applied to the ROW1 and the ROW3, and to the ROW2, a pulse of +V1/2 which is out of phase with the pulses applied to the ROW1 and the ROW3 is applied. At this time, a pulse which is of a voltage ±V1/2 and is in phase with the pulse applied to the ROW2 is applied to the COLUMN. Thereby, 0 volt is applied to the LCD2, and an evolution pulse of a voltage ±Ve=±V1/2 is applied to the LCD1 and the LCD3.

While the LCD2 is in the selection pulse application step, a pulse of a voltage +V1/2 is applied to the ROW1, the ROW2 and the ROW3. The voltage difference between a data pulse applied to the COLUMN and the voltage (±V1/2 or 0) is applied to the LCD2 as a selection pulse of a voltage ±Vse1. By changing the form of the data pulse applied to the COLUMN, the pulse width of the selection pulse can be changed.

In the post-selection step, application of pulses to the ROWS 1–3 and the COLUMN is carried out in the same way as in the pre-selection step.

In the steps other than the reset step, the selection step and the evolution step, pulses in phase with the data pulse applied to the data electrode in the pre-selection step and in the post-selection step are applied, and while any of the other scan electrodes is in the selection pulse application step, a pulse of a voltage +V1/2 is applied. Thereby, to the part of the liquid crystal corresponding to this pixel, a crosstalk voltage ±V1/2 with the same pulse width as that of the selection pulse is applied. The pulse width of this crosstalk voltage is too narrow to change the state of the liquid crystal.

By applying the above-described pulses to the scan electrodes repeatedly, an image can be displayed on the liquid crystal display. Of course, partial writing on the liquid crystal display is possible.

In the third example, the driving IC for the rows (scan electrodes) has three output levels (V1, V1/2 and GND), and the driving IC for the columns (data electrodes) has three output levels (V1, V1/2 and GND). The voltage V1 is necessary only for the reset of all the screen. Therefore, by using voltage switching means, e.g., an analog switch, as used in the second example, it becomes possible to switch the voltage supplied from a power source in the reset step and in the other steps. Thereby, in the reset step, the driving IC for the rows must have merely two output levels (V1 and GND), and the driving IC for the columns must have merely two output levels (V1/2 and GND). In the selection step, the driving IC for the rows must have merely two output levels (V1/2 and GND), and the driving IC for the columns must have merely two output levels (V1/2 and GND). Then, the cost for the drivers can be reduced more.

Fourth Example of Matrix Driving; See FIG. 14

Figure 14:
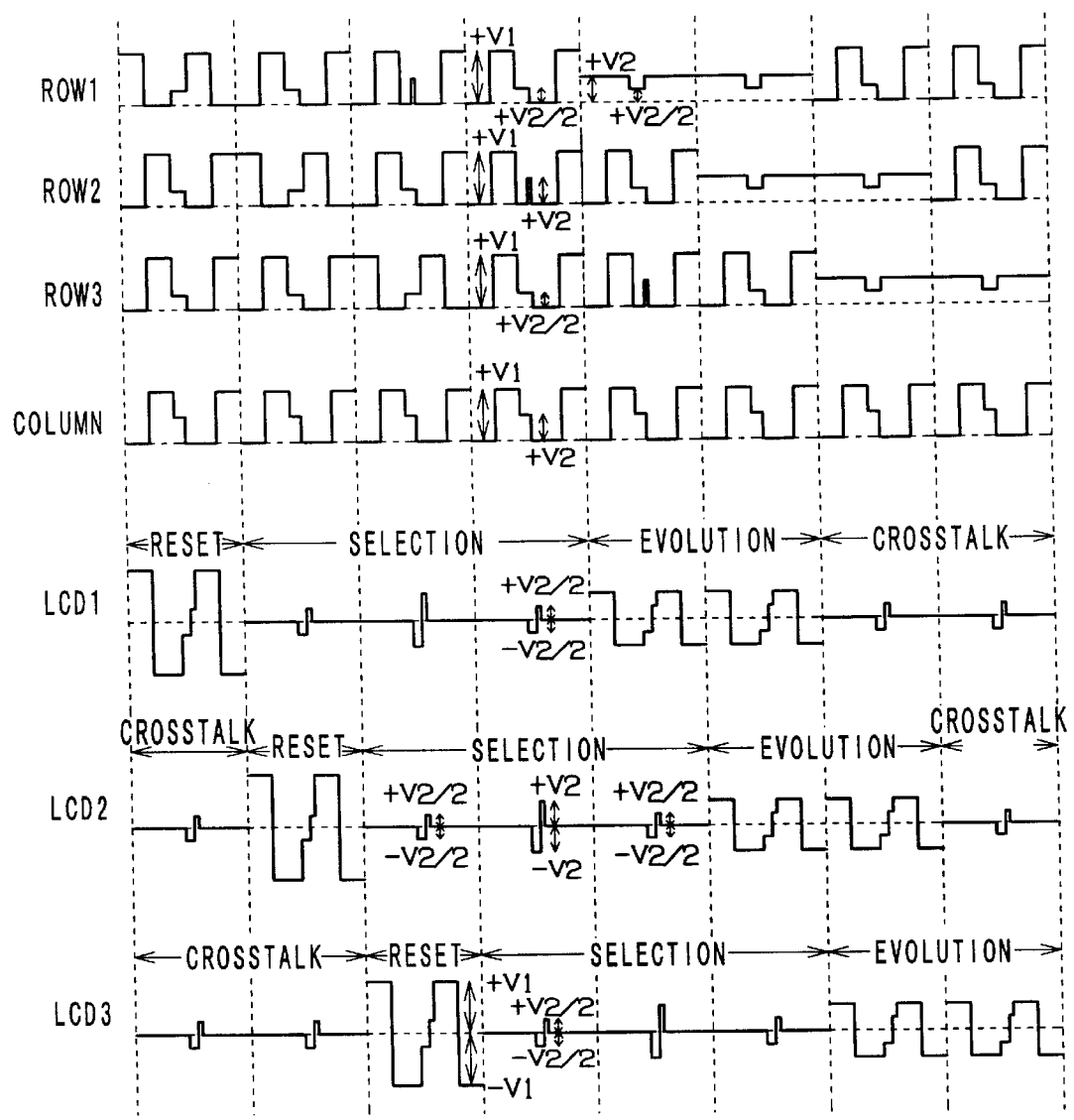
FIG. 14 is a chart which shows driving waveforms in a fourth example.

FIG. 14 shows driving waveforms according to the fourth example to take a longer time to untwist the liquid crystal. In the fourth example, the selection step has a step of applying a pulse of a voltage ±V2/2, a step of applying a selection pulse of a voltage ±V2 and a step of applying a pulse of a voltage ±V2/2. The pulses of ±V2/2 are of the same voltage and of the same form as crosstalk, and the waveform applied to the scan electrode and the waveform applied to the data electrode in these steps are of the same as those in the crosstalk step. By applying these waveforms, in the selection step, the time in which 0 volt is applied to the liquid crystal is longer, and the time to untwist the liquid crystal is longer. In this case, because the time to select one line is shorter than the time to untwist the liquid crystal, it is possible to shorten the time for writing on the liquid crystal.

The driving ICs which has the circuits shown by FIGS. 8 and 9 can be used for the fourth example.

Second Principle; See FIG. 15

Next, the second principle of the liquid crystal display driving method according to the present invention is described. Although specific examples which use alternated pulse waveforms will be described in the following paragraphs, the driving method according to the present invention does not necessarily use such waveforms.

Figure 15:
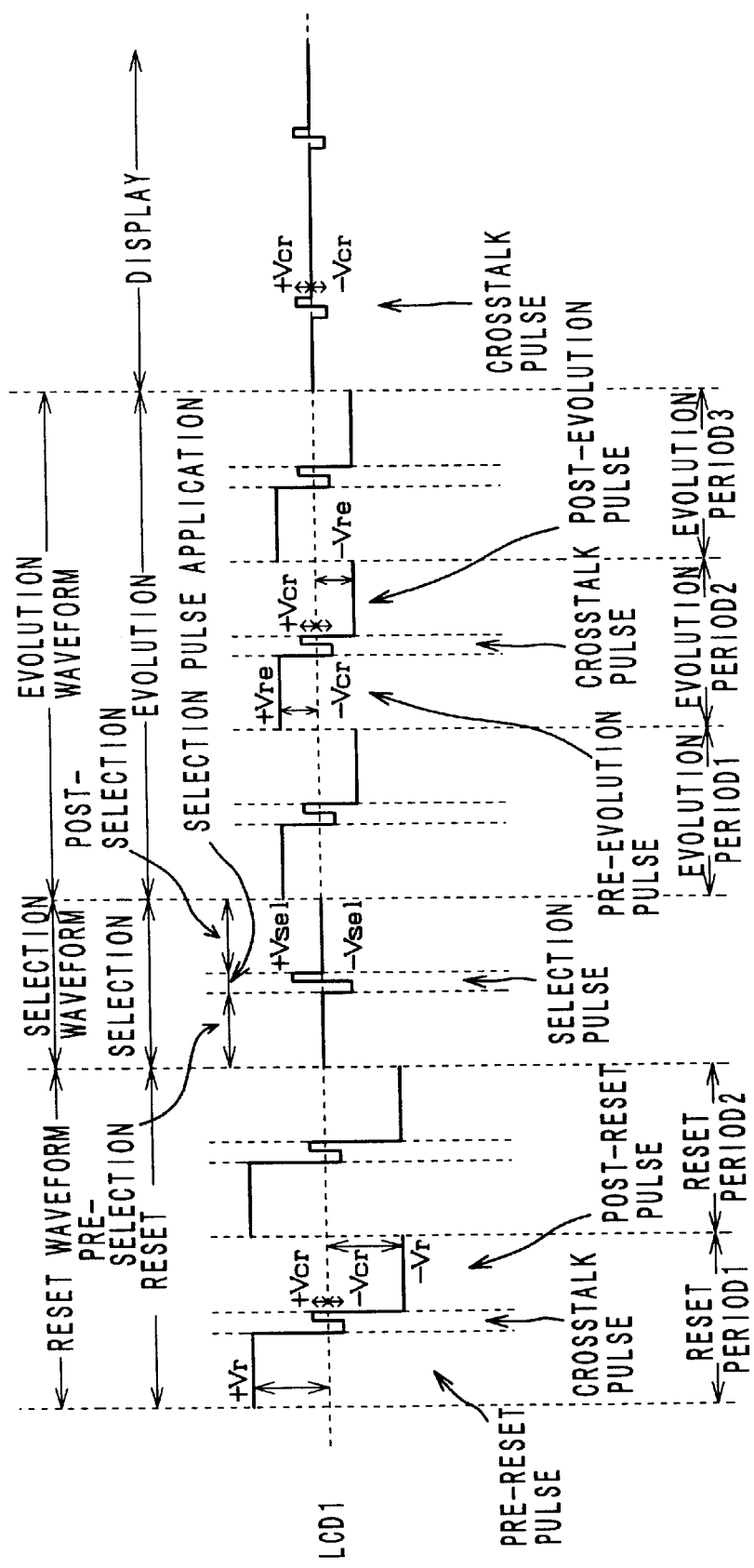
FIG. 15 is a chart which shows driving waveforms based on a second principle of the driving method according to the present invention.

As FIG. 15 shows, the driving method generally comprises a reset step, a selection step, an evolution step and a display step (crosstalk step). In the reset step, liquid crystal is reset to a homeotropic state. In the selection step, a voltage to select the final state of the liquid crystal is applied. In the evolution step, the liquid crystal evolves to the state selected in the selection step.

The reset step is composed of a plurality of periods, each of which corresponds to the length of the selection step. In the case of FIG. 15, the reset step is composed of a reset period 1 and a reset period 2. In each of the reset periods, a pre-reset pulse of a voltage +Vr, a crosstalk pulse of a voltage ±Vcr and a post-reset pulse of a voltage −Vr are applied to the pixel. A series of these pulses for a plurality of periods is referred to as a reset waveform.

In the same way, the evolution step is composed of a plurality of periods, and in the case of FIG. 15, the evolution step is composed of three periods. In each of the periods, a pre-evolution pulse of a voltage +Vre, a crosstalk pulse of a voltage ±Vcr and a post-evolution pulse of a voltage −Vre are applied to the pixel. A series of these pulses for a plurality of periods is referred to as an evolution pulse waveform.

In the display step, crosstalk pulses of a voltage ±Vcr which occur in response to signals to select the pixels on the other scan electrodes are applied. Also, it is possible to stop the driving ICs 131 and 132 to apply 0 volt when writing of an image is completed, that is, when all the pixels have gone through the evolution step.

The selection step is composed of a pre-selection step, a selection pulse application step and a post-selection step. In the selection pulse application step, a selection pulse of a voltage ±Vsel is applied to the pixel, and the width of the selection pulse is adjusted in accordance with image data.

The state of the liquid crystal corresponding to the pixel is described in the following. In the reset step in which the reset waveform is applied, the liquid crystal is reset to the homeotropic state. Next, in the pre-selection step, 0 volt is applied, and the liquid crystal is twisted a little. The form of the selection pulse applied in the selection pulse application step depends on whether the pixel is selected to finally come to a planar state or to finally come to a focal-conic state.

First, a case of selecting a planar state as the final state of a pixel is described. In this case, in the selection pulse application step, a selection pulse of ±Vsel is applied to make the liquid crystal come to the homeotropic state again.

Thereafter, the voltage is made zero in the post-selection step, and thereby, the liquid crystal is untwisted a little. Next, in the evolution step, the evolution waveform is applied. By the application of the evolution waveform, the liquid crystal, which has been untwisted a little in the post-selection step, is completely untwisted to come to the homeotropic state.

In the display step, the crosstalk pulses are applied to the liquid crystal; however, the pulse width of the crosstalk pulses is too narrow to change the state of the liquid crystal. The liquid crystal in the homeotropic state comes to a planar state when the voltage applied thereto becomes zero, and the liquid crystal stays in the planar state even while the voltage is kept zero.

On the other hand, in a case of selecting a focal-conic state as the final state of a pixel, the voltage applied to the liquid crystal in the selection application step is made zero. In other words, the pulse width of the selection pulse is set to zero. Then, as in the case of selecting a planar state, 0 volt is applied to the liquid crystal in the post-selection time. Thereby, the liquid crystal is untwisted, and the helical pitch is widened approximately double.

Thereafter, in the evolution step, the evolution waveform is applied. Thereby, the liquid crystal, which has been untwisted in the post-selection step, comes to a focal-conic state. In the same way as in the case of selecting a planar state, in the display step, crosstalk pulses are applied to the liquid crystal; however, the pulse width of the crosstalk pulses is too narrow to change the state of the liquid crystal. The liquid crystal in the focal-conic state stays in the same state even after the voltage applied thereto becomes zero.

As has been described above, the final display state of the liquid crystal is determined depending on the selection pulse which is applied in the selection step. Also, by adjusting the pulse width of the selection pulse, more specifically, by changing the pulse form applied to the data electrode in accordance with image data, display of intermediate tones is possible.

In the following, specific examples of a simple matrix driving method based on the second principle are described.

Fifth Example of Matrix Driving; See FIG. 16

Figure 16:
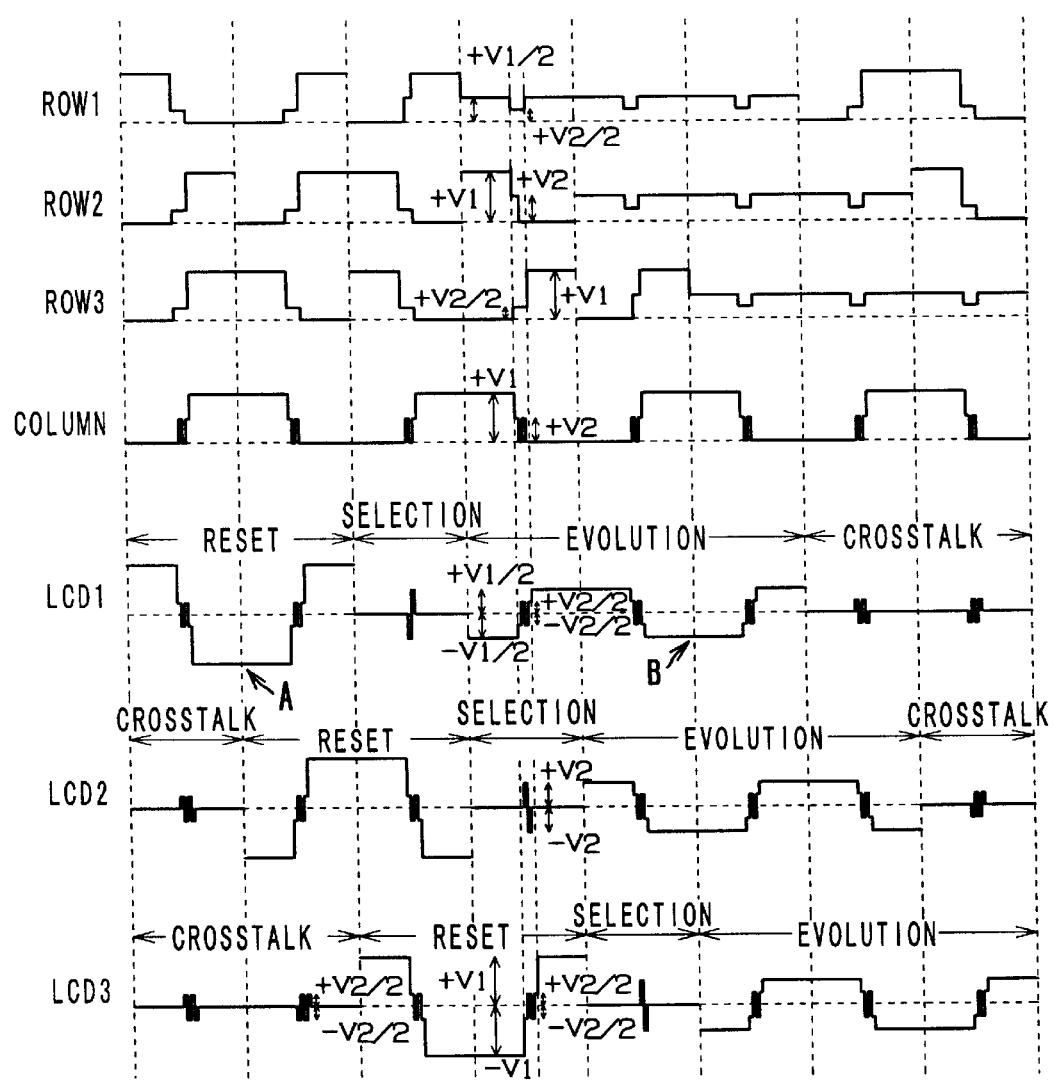
FIG. 16 is a chart which shows driving waveforms in a fifth example.

FIG. 16 shows driving waveforms in the fifth example of matrix driving. FIG. 16 shows driving voltage waveforms which are applied to pixels LCD1, LCD2 and LCD3 arranged in a matrix and exemplary pulse waveforms applied to scan electrodes (rows) and a data electrode (column) to achieve the driving voltage waveforms. In FIG. 16, "ROW1", "ROW2" and "ROW3" mean the respective lines on scan electrodes, and "COLUMN" means the line on a data electrode.

In the fifth example, as mentioned above, the selection step is composed of a pre-selection step, a selection pulse application step and a post-selection step, and in the selection pulse application step, a selection pulse is applied. The form of the selection pulse depends on image data to be written on the pixel. On the other hand, at the pre-selection step and at the post-selection step of every pixel, the voltage applied thereto must be zero, and a combination of specified pulse waveforms to be applied to the rows and the columns to cause application of 0 volt to the pixels can be used. In the fifth example, by using this, reset, evolution and display are carried out simultaneously on the pixels on a plurality of scan electrodes.

For example, while the LCD2 is in the pre-selection step, a voltage +V1 is applied to the ROW2, 0 volt is applied to the ROW3, and a voltage +V1/2 is applied to the ROW1. By applying a voltage +V1 to the COLUMN at this time, a pre-reset pulse of a voltage −Vr=−V1 is applied to the LCD3, 0 volt is applied to the LCD2, and an evolution pulse of a voltage −Vre=−V1/2 is applied to the LCD1.

While the LCD2 is in the selection pulse application step, a data pulse which is of a voltage +V2 and of a form depending on the image data is applied to the COLUMN. At this time, a voltage +V2/2 is applied to the ROW1 and to the ROW3 so that a voltage ±V2/2 will be applied to the LCD1 and the LCD3. A voltage +V2 is applied to the ROW2 so that the voltage difference between the data pulse applied to the COLUMN and the voltage (±V2 or 0) will be applied to the LCD2 as a selection pulse ±Vse1. By changing the form of the data pulse, the pulse width of the selection pulse can be changed, whereby intermediate tones can be displayed.

Next, while the LCD2 is in the post-selection step, 0 volt is applied to the ROW2, a voltage +V1 is applied to the ROW3, and a voltage +V1/2 is applied to the ROW1. By applying 0 volt to the COLUMN at this time, a post-reset pulse of a voltage +Vr=+V1 is applied to the LCD3, 0 volt is applied to the LCD2, and an evolution pulse of a voltage +Vre=+V1/2 is applied to the LCD1.

To a row (not shown) which is not in any of the reset step, the selection step and the evolution step, a pulse waveform in phase with the data pulse applied to the COLUMN in the pre-selection step and in the post-selection step is applied, and while the row is in the selection pulse application step, a pulse voltage of +V2/2 is applied. Thereby, to this part of the liquid crystal, a crosstalk voltage ±V2/2 with the same pulse width as that of the selection pulse is applied. The pulse width of this crosstalk voltage is too narrow to change the state of the liquid crystal.

Also, while the LCD3 is in the pre-selection step, a voltage +V1/2 is applied to the ROW1 and the ROW2, 0 volt is applied to the ROW3, and a voltage +V1 is applied to the row (not shown) which is in the reset step. By applying a voltage +V1 to the COLUMN at this time, an evolution pulse of a voltage +Vre=+V1/2 is applied to the LCD1 and the LCD2, 0 volt is applied to the LCD3, and a voltage of +Vr=+V1 is applied to the pixel on the row which is in the reset step.

Next, while the LCD3 is in the selection pulse application step, a data pulse which is of a voltage +V2 and of a form depending on the image data is applied to the COLUMN. At this time, a voltage +V2/2 is applied to the ROW1, the ROW2 and the unshown row in the reset step so that a voltage ±V2/2 will be applied to the LCD1, the LCD2 and the pixel on the unshown row in the reset step. A voltage +V2 is applied to the ROW3 so that the voltage difference between the data pulse applied to the COLUMN and the voltage (±V2 or 0) will be applied to the LCD3 as a selection pulse ±Vse1. By changing the form of the data pulse, the pulse width of the selection pulse can be changed, whereby intermediate tones can be displayed.

Next, while the LCD3 is in the post-selection step, 0 volt is applied to the ROW1 and the ROW2, a voltage +V1 is applied to the ROW3, and 0 volt is applied to the unshown row in the reset step. By applying a voltage +V1 to the COLUMN at this time, a post-evolution pulse of a voltage −Vre=−V1/2 is applied to the LCD3, 0 volt is applied to the LCD3, and a reset pulse of a voltage −Vr=−V1 is applied to the pixel on the unshown row.

To a row (not shown) which is not in any of the reset step, the selection step and the evolution step, a pulse waveform in phase with the data pulse applied to the COLUMN in the pre-selection time and in the post-selection time is applied, and while the row is in the selection pulse application step, a pulse voltage of +V2/2 is applied. Thereby, to this part of the liquid crystal, a crosstalk voltage ±V2/2 with the same pulse width as that of the selection pulse is applied. The pulse width of this crosstalk voltage is too narrow to change the state of the liquid crystal.

Thereafter, the above-described steps are repeated, and thus, the reset waveform, the selection waveform and the evolution waveform are applied to desired lines (scan electrodes). Accordingly, partial writing of the liquid crystal display is possible.

In the fifth example, as arrow "A" in FIG. 16 shows, the post-reset pulse and the pre-reset pulse in consecutive reset periods are of the same polarity, and as arrow "B" in FIG. 16 shows, the post-evolution pulse and the pre-evolution pulse in consecutive evolution periods are of the same polarity. Therefore, in the reset step and in the evolution step, the number of times of inverting the polarity of the voltage can be reduced to a half, and the electric power consumption can be reduced.

In the reset step, the selection step, the evolution step and the display step, the integral of voltages of the positive polarity and the integral of voltages of the negative polarity are equal to each other. Thereby, the liquid crystal will have no deviation in polarity and will be inhibited from degrading.

Sixth Example of Matrix Driving; See FIGS. 17 and 18

FIG. 17 show driving waveforms in the sixth example. In the sixth example, "ROW1", "ROW2", "ROW3", "COLUMN", "LCD1", "LCD2" and "LCD3" mean the same as in the fifth example. In the sixth example, the form of the selection pulse in the selection application step is modified so as to reduce the number of times of inverting the polarity, which results in a reduction in electric power consumption. Driving pulse waveforms applied to the rows and the columns in the reset step and in the evolution step are the same as those in the second principle shown by FIG. 15.

In the following, application of the selection pulse to the LCD2 is described. The characteristic of the sixth example is that in the selection pulse application step Ts (see FIG. 18) of a selected row, 0 volt is applied to the row for the first half of the time Ts (for Ts/2), and a voltage +V2 is applied for the latter half of the time Ts. To the other non-selected rows, a voltage +V2/2 is applied. In the meantime, to the COLUMN, 0 volt is applied for a time (Ts−Ton)/2, a voltage +V2 is applied for a subsequent time Ton/2+(Ts−Ton)/2, and 0 volt is applied for the last Ton/2.

In the sixth example, the selection pulse is composed of a pre-selection pulse and a post-selection pulse which are of mutually opposite polarities. Adjustment of the pulse width is carried out based on the end of each of the pulses. Specifically, a voltage for the pre-selection pulse is applied for the time Ton/2 immediately before the end of the pre-selection pulse, and a voltage for the post-selection pulse is applied for the time Ton/2 immediately before the end of the post-selection pulse. Then, 0 volt is applied for the rest of the selection pulse application step.

In this example, to the pixels on a row in the selection pulse application step, 0 volt is applied for a time (Ts−Ton)/2, a voltage −2V is applied for a time Ton/2, 0 volt is applied for a time (Ts−Ton)/2, and a voltage +2V is applied for a time Ton/2, serially. Meanwhile, to the pixels on the other rows, a voltage +V2/2 is applied for a time (Ts−Ton)/2, a voltage $-2V/2$ is applied for $Ton/2+(Ts-Ton)/2$, and a voltage $+V2/2$ is applied for a time $Ton/2$, serially.

Thus, the number of times of inverting the polarity of a voltage applied in the selection pulse application step is reduced, and the number of inverting the polarity of the voltage applied to the pixels on the other non-selected rows, that is, the number of inverting the polarity of the crosstalk voltage can be reduced. For example, in the sixth example, the number of inverting the polarity of the crosstalk voltage is three, while that in the fifth example shown by FIG. 16 is four. Thereby, the electric power consumption can be reduced.

Seventh Example of Matrix Driving; See FIGS. 19 and 20

Figure 19:
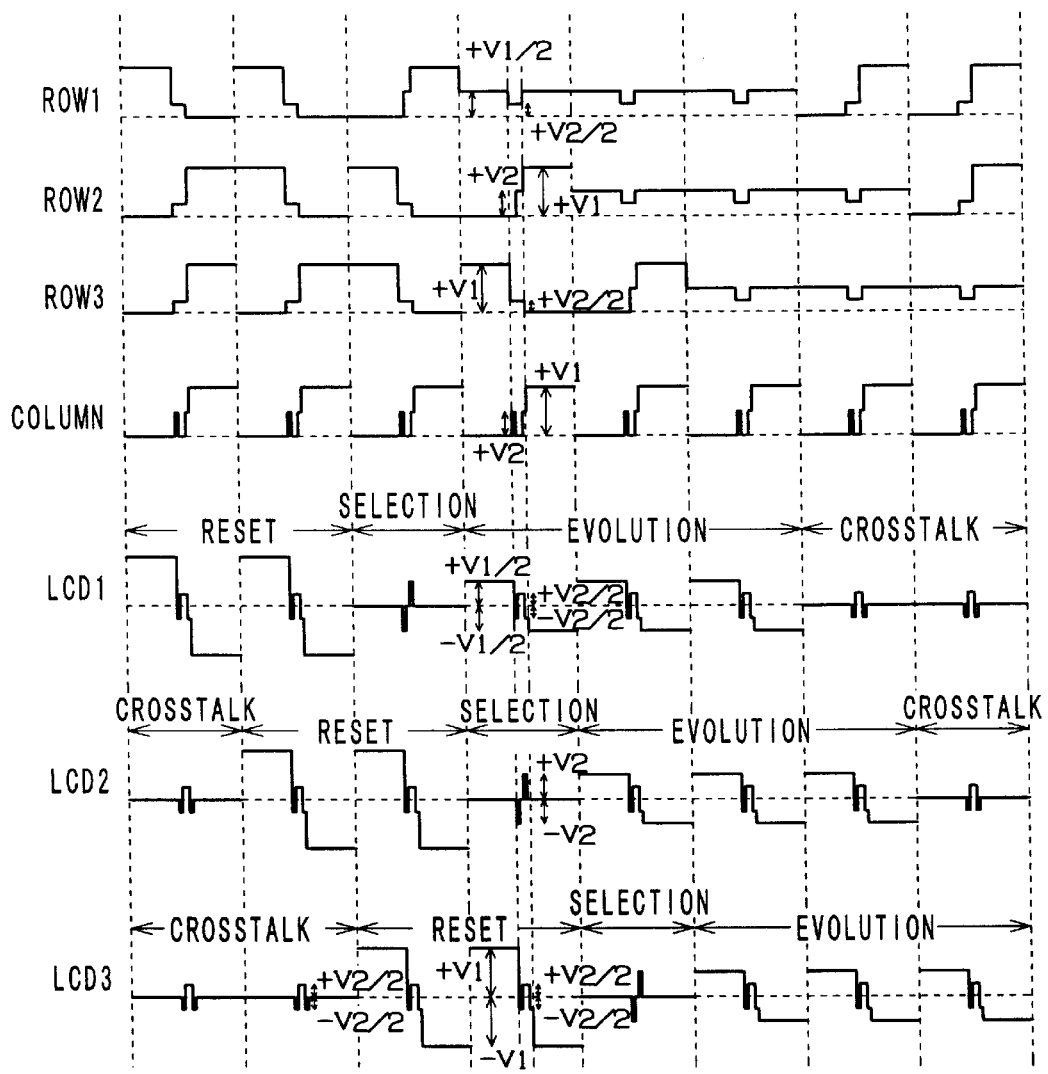
FIG. 19 is a chart which shows driving waveforms in a seventh example.
Figure 20:
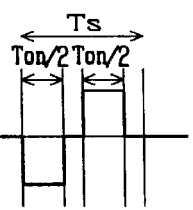
FIG. 20 is a chart which shows a selection pulse in the seventh example.

FIG. 19 shows driving waveforms in the seventh example. In the seventh example, as in the sixth example, the form of the selection pulse is modified so that the number of times of inverting the polarity can be reduced, which results in a reduction in electric power consumption.

In the following, application of the selection pulse to the LCD2 is described. The characteristic of the seventh example is that in the selection pulse application step Ts (see FIG. 20) of a selected row, a voltage $+V2$ is applied to the row for the first half of the time Ts (for Ts/2), and 0 volt is applied for the latter half of the time Ts. To the other non-selected rows, a voltage $+V2/2$ is applied for the time Ts. In the meantime, to the COLUMN, a voltage $+V2$ is applied for a time $Ton/2+(Ts-Ton)/2$, 0 volt is applied for a subsequent time $(Ts-Ton)/2$, and a voltage $+V2$ is applied for the last $Ton/2$.

In the seventh example, the selection pulse is composed of a pre-selection pulse and a post-selection pulse which are of mutually opposite polarities. Adjustment of the pulse width is carried out based on the beginning of the pulses. Specifically, a voltage for the pre-selection pulse is applied for the time $Ton/2$ immediately after the beginning of the pre-selection pulse, and a voltage for the post-selection pulse is applied for the time $Ton/2$ immediately after the beginning of the post-selection pulse. Then, 0 volt is applied for the rest of the selection pulse application step.

In this example, to the pixels on a row in the selection pulse application step, a voltage $-2V$ is applied for a time $Ton/2$, 0 volt is applied for a time $(Ts-Ton)/2$, a voltage $+2V$ is applied for a time $Ton/2$ and 0 volt is applied for a time $(Ts-Ton)/2$, serially. Meanwhile, to the pixels on the other rows, a voltage $-2V/2$ is applied for a time $Ton/2$, a voltage $+V2/2$ is applied for $(Ts-Ton)/2+Ton/2$, and a voltage $-2V/2$ is applied for a time $(Ts-Ton)/2$, serially.

Thus, as in the sixth example, the number of times of inverting the polarity of a voltage applied in the selection pulse application step is reduced, and the number of inverting the polarity of the voltage applied to the pixels on the other non-selected rows, that is, the number of inverting the polarity of the crosstalk voltage can be reduced.

Eighth Example of Matrix Driving; See FIG. 21

Figure 21:
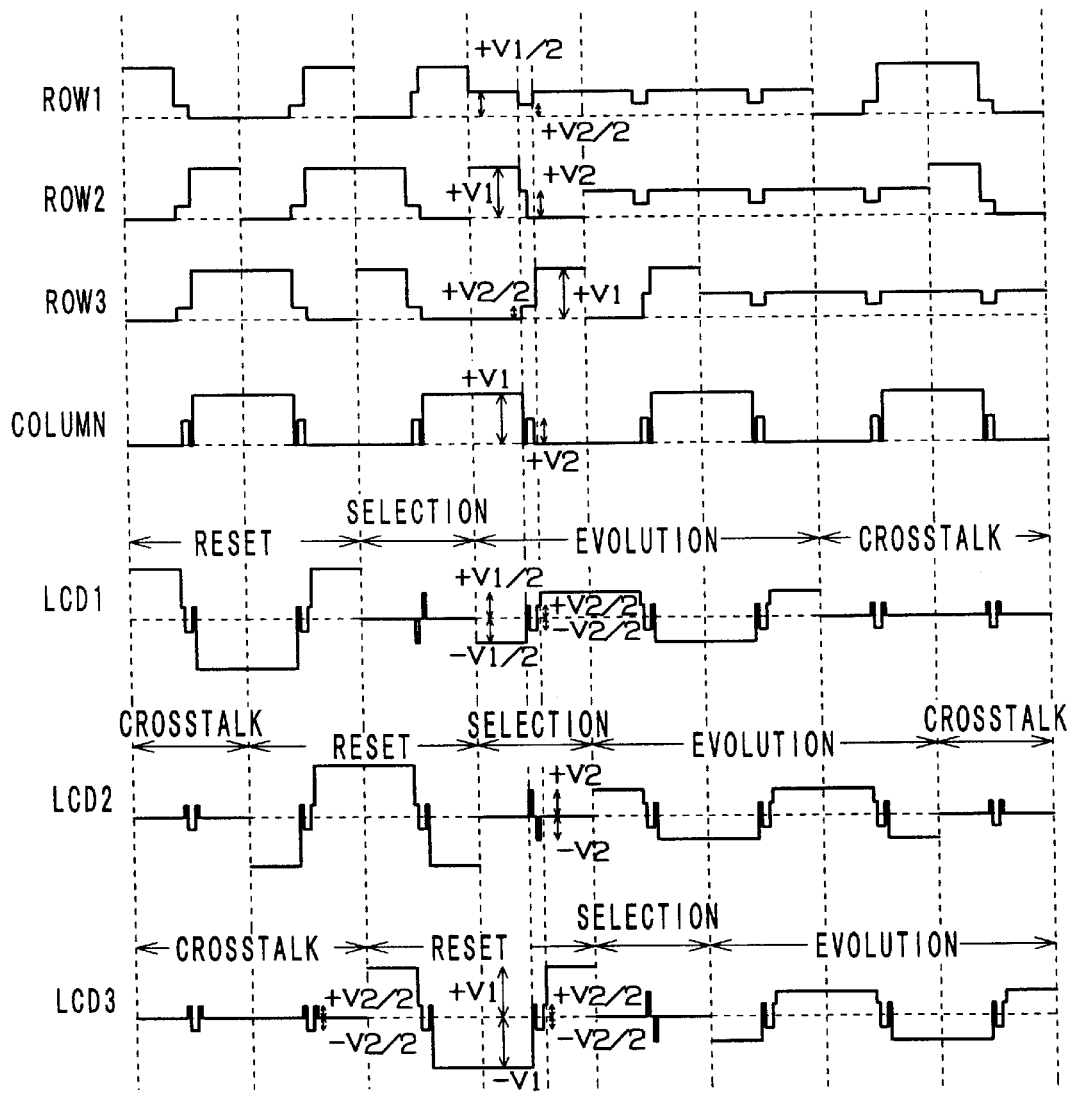
FIG. 21 is a chart which shows driving waveforms in an eighth example.

FIG. 21 shows driving waveforms in the eighth example. The eighth example is a combination of the fifth example and the sixth example or a combination of the fifth example and the seventh example. Therefore, the advantage of the eighth example is a combination of the advantage of the fifth example and the advantage of the sixth example or the seventh example, which is to reduce the electric power consumption more.

Next, a driving method to adjust the scanning speeds of the respective display colors to each other and to compensate a change in responsiveness of the liquid crystal with a change in temperature is described referring to specific examples 9 through 14. The driving method is based on the second principle shown by FIG. 15. The characteristic of the driving method is to apply a compensation pulse in a pre-selection step and a post-selection step in a selection step.

Specifically, as FIG. 22 shows, the selection step is composed of a pre-selection step, a selection pulse application step and a post-selection step, and in the pre-selection step, a pre-compensation pulse of a voltage $+Vcomp$ is applied. The pre-selection step is divided into a time in which the pre-compensation pulse is applied and a time in which the pre-compensation pulse is not applied. In the selection pulse application step, a selection pulse of a voltage $\pm Vse1$ is applied. The pulse width of the selection pulse is changed in accordance with image data. In the post-selection step, a post-compensation pulse of a voltage $-Vcomp$ is applied, and the post-selection step is divided into a time in which the post-compensation pulse is applied and a time in which the post-compensation pulse is not applied.

Next, the state of liquid crystal is described. First, a reset waveform is applied in the reset step, and thereby, the liquid crystal is reset to a homeotropic state. Subsequently, while the pre-compensation pulse of a voltage $+Vcomp$ is applied in the pre-selection step, the liquid crystal stays in the homeotropic state. After the application of the pre-compensation pulse, that is, while 0 volt is applied for the rest of the pre-selection step, the liquid crystal is twisted a little. Next, a selection pulse is applied in the selection pulse application step; the form of the selection pulse depends on whether the pixel is selected to finally come to a planar state or to finally come to a focal-conic state.

First, a case of selecting a planar state as the final state of a pixel is described. In this case, in the selection pulse application step, a selection pulse of a voltage $\pm Vse1$ is applied, and thereby, the liquid crystal comes to a homeotropic state again. Thereafter, when the voltage is made zero in the post-selection step, the liquid crystal is untwisted a little. Then, the post-compensation pulse of a voltage $-Vcomp$ is applied, and the evolution waveform is applied in the evolution step. Thereby, the liquid crystal, which has been untwisted a little in the post-selection step, is completely untwisted and comes to the homeotropic state.

Crosstalk pulses are applied to the liquid crystal in the display step; however, the pulse width of the crosstalk pulses is too narrow to change the state of the liquid crystal. The liquid crystal in the homeotropic state comes to a planar state when the voltage applied thereto becomes zero. Thereafter, while the voltage applied thereto is kept zero, the liquid crystal stays in the planar state.

In a case of selecting a focal-conic state as the final state of a pixel, 0 volt is applied to the liquid crystal in the selection pulse application step. In other words, the pulse width of the selection pulse is set to zero. Then, as in the case of selecting a planar state, in the post-selection step, 0 volt is applied. Thereby, the liquid crystal is untwisted, and the helical pitch is widened approximately double.

Thereafter, the post-compensation pulse $-Vcomp$ is applied, and the evolution waveform is applied in the evolution step. The liquid crystal, which has been untwisted in the post-selection step, comes to a focal-conic state by the application of the post-compensation pulse and the evolution waveform. In the display step, as in the case of selecting a planar state, crosstalk pulses are applied to the liquid crystal; however, the pulse width is too small to change the state of the liquid crystal. The liquid crystal in a focal-conic state stays in the same state even while the voltage applied thereto is made zero.

As described above, the final state of the liquid crystal depends on the selection pulse applied in the selection pulse application step. Also, by adjusting the pulse width of the selection pulse, and more specifically by changing the form of the pulse applied to the data electrode in accordance with image data, intermediate tones can be displayed.

According to the above-described driving waveform, the time from the end of application of the pre-compensation pulse to the start of application of the post-compensation pulse is long enough that the liquid crystal can be untwisted until the helical pitch is widened approximately double. In this specification, this time is referred to as a response time. If no compensation pulses are applied, the response time is the length of the selection step, that is, the time from the end of application of the reset pulse to the start of application of the evolution pulse.

As described above, by applying compensation pulses with pulse widths adjusted in accordance with the display color in the pre-selection step and in the post-selection step, the scanning speeds of the respective colors can be adjusted to be equal to each other. Also, by applying compensation pulses with pulse widths adjusted in accordance with the temperature, changes in display performance with changes in temperature can be inhibited.

Ninth Example of Matrix Driving; See FIG. 23

In the ninth example, the compensation pulses are applied as temperature compensation pulses.

FIG. 23 shows driving waveforms applied to a plurality of pixels LCD1, LCD2 and LCD3 which are arranged in a matrix and exemplary pulse waveforms applied to the scan electrodes (rows) and the data electrode (column) to achieve the driving waveforms. "ROW1", "ROW2" and "ROW3" mean the lines on three scan electrodes, and "COLUMN" means the line on one data electrode.

In the ninth example, as in the above-described examples, the selection step is composed of a pre-selection step, a selection pulse application step and a post-selection step. In the pre-selection step, a pre-temperature compensation pulse is applied. In the selection pulse application step, a selection pulse is applied. In the post-selection step, a post-temperature compensation pulse is applied. The pulse width of the selection pulse depends on image data. If application of the temperature compensation pulses is not necessary, the voltage applied to the liquid crystal in the pre-selection step and in the post-selection step is zero all the time. Therefore, a combination of waveforms applied to a row and a column to achieve 0 volt on the liquid crystal can be used for different processes. By using this, reset, evolution and display of a plurality of scan electrodes are carried out simultaneously.

For example, while the LCD2 is in the pre-selection step, voltages are applied to the rows as follows: a voltage $+V1/2$ is applied to the ROW2, and thereafter, the voltage is made zero; a voltage $+V1$ is applied to the ROW 3; and a voltage $+V1/2$ is applied to the ROW1. At this time, by applying 0 volt to the COLUMN, a pre-reset pulse of a voltage $+Vr=+V1$ is applied to the LCD3; a pre-temperature compensation pulse $+Vcomp=+V1/2$ is applied to the LCD2; and an evolution pulse of a voltage $+Vre=+V1/2$ is applied to the LCD1.

While the LCD2 is in the selection pulse application step, a data pulse of a voltage $+V1$ with a pulse form in accordance with image data is applied to the COLUMN. Accordingly, in the meantime, a voltage $+V2/2$ is applied to the ROW1 and the ROW3 so that a voltage $\pm V2/2$ will be applied to the LCD1 and the LCD3. A voltage $+V1$ is applied to the ROW2, so that the voltage difference between the data pulse applied to the COLUMN and the voltage $+V1$ ($\pm V2$ or 0) is applied to the LCD2 as a selection pulse $\pm Vsel$. By changing the form of the data pulse, the pulse width of the selection pulse can be changed, and thereby, intermediate tones can be displayed.

Next, while the LCD2 is in the post-selection step, voltages are applied to the rows as follows: a voltage $+V1$ and a voltage $+V1/2$ are applied to the ROW2; 0 volt is applied to the ROW3; and a voltage $+V1/2$ is applied to the ROW1. At this time, by applying a voltage $+V1$ to the COLUMN, a post-reset pulse of a voltage $-Vr=-V1$ is applied to the LCD3; a post-temperature compensation pulse of a voltage $-Vcomp=-V1/2$ is applied to the LCD2; and an evolution pulse of a voltage $-Vre=-V1/2$ is applied to the LCD 1.

To a row (not shown) which is not in any of the reset step, the selection step and the evolution step, a pulse waveform in phase with the data pulse which is applied to the COLUMN in the pre-selection step and in the post-selection step is applied, and while the row is in the selection pulse application step, a voltage of $+V1/2$ is applied. Thereby, to the LCD in this part, a crosstalk pulse of a voltage $+V1/2$ with the same pulse width as that of the selection pulse is applied. The pulse width of this crosstalk pulse is too narrow to change the state of the liquid crystal.

Thereafter, the above-described steps are repeated, and thus, the reset waveform, the selection waveform and the evolution waveform are applied to desired lines (scan electrodes). Accordingly, partial writing on the liquid crystal display is possible.

In the ninth example, the scan electrode driving IC 131 has five output levels (V1, V1/2, V2, V2/2 and GND), and the data electrode driving IC 132 has three output levels (V1, V2 and GND).

Figure 24:
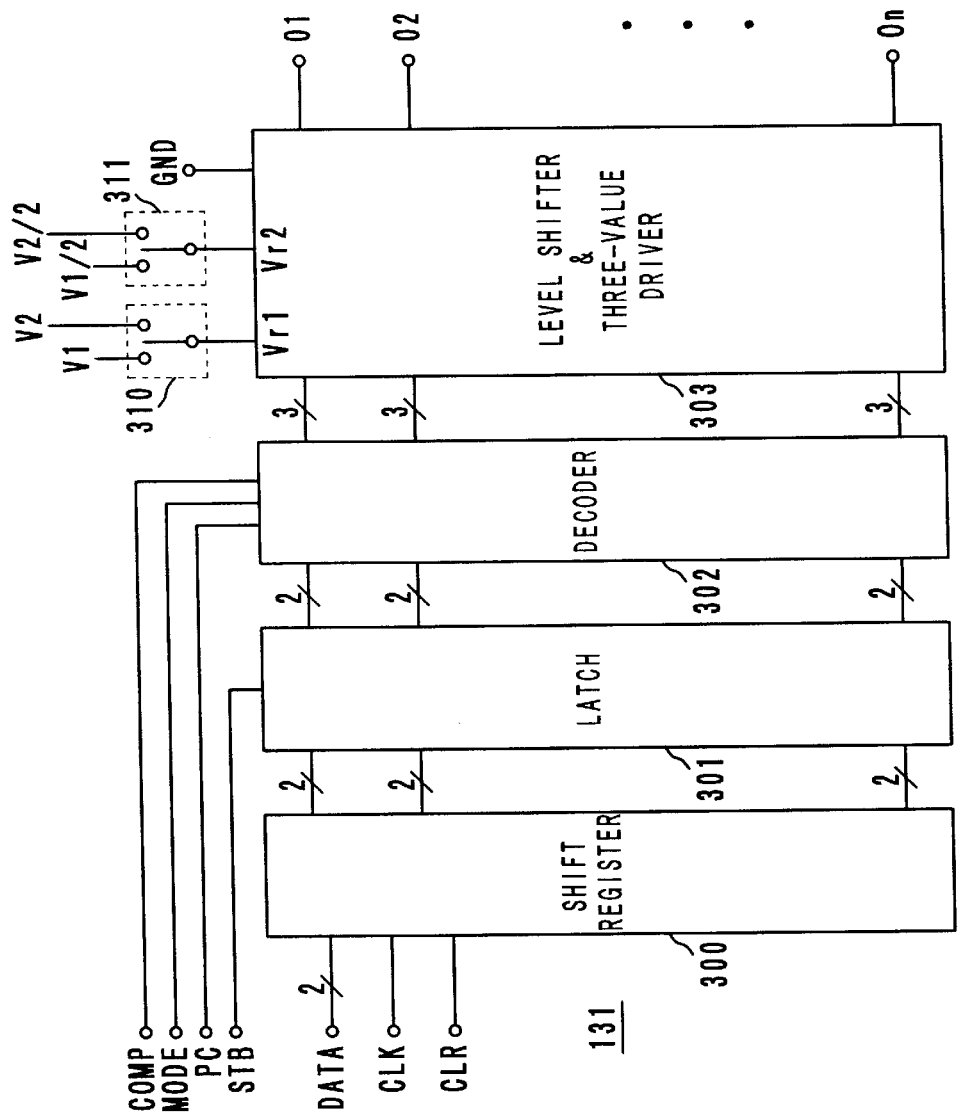
FIG. 24 is a block diagram which shows a scan electrode driving IC used in the ninth example.

FIG. 24 shows the internal circuit of the scan electrode driving IC 131 which outputs the driving waveforms shown in FIG. 23. The scan electrode driving IC 131 comprises a shift register 300, a latch 301, a decoder 302, a level shifter/three-value driver 303 with a high withstand voltage and analog switches 310 and 311. In the driving IC 131, a compensation pulse signal COMP, a mode switch signal MODE and a polarity conversion signal PC are inputted to the decoder 302. A strobe signal STB is inputted to the latch 301. A data signal DATA, a shift clock signal CLK and a clear signal CLR are inputted to the shift register 300.

Operation of the scan electrode driving IC 131 is described. In response to the two-bit data signal DATA and the shift clock signal CLK, the shift register 300 sets two-bit data therein. Next, in response to the strobe signal STB, the data set in the shift register 300 is latched in the latch 301. Based on the latched two-bit data signal DATA, the polarity conversion signal PC, the mode switch signal MODE and the compensation pulse signal COMP, the decoder 302 decodes the two-bit data signal DATA and drives the level shifter/three-value driver 303. The level shifter/three-value driver 303 outputs a voltage selected from Vr1, Vr2 and GND.

Table 3 is a truth table of the scan electrode driving IC 131. In accordance with the combination of the two-bit data signal DATA, the compensation pulse signal COMP, the polarity conversion signal PC and the mode switch signal MODE, the driving IC 131 outputs one of the three voltages Vr1, Vr2 and GND. By setting Vr1=V1 and Vr2=V1/2 for the pre-selection step and the post-selection step and by setting Vr1=V2 and Vr2=V2/2 for the selection pulse application step, the driving waveforms shown in FIG. 23 can be achieved.

TABLE 3

| | Step | DATA 1 | DATA 2 | COMP | PC | Output |
|---|---|---|---|---|---|---|
| MODE 1 | Reset | 1 | 0 | X | 0 | Vr1 |
| | Evolution | 0 | 1 | X | 0 | Vr2 |
| | Selection | 0 | 0 | 0 | 0 | GND |
| | | 0 | 0 | 1 | 0 | Vr2 |
| | Display | 1 | 1 | 0 | 0 | GND |
| | Reset | 1 | 0 | 1 | 1 | GND |
| | Evolution | 0 | 1 | 1 | 1 | Vr2 |
| | Selection | 0 | 0 | 0 | 1 | Vr1 |
| | | 0 | 0 | 1 | 1 | Vr2 |
| | Display | 1 | 1 | 1 | 1 | Vr1 |
| MODE 2 | Reset | 1 | 0 | X | 0 | Vr2 |
| | Evolution | 0 | 1 | X | 0 | Vr2 |
| | Selection | 0 | 0 | 0 | 0 | GND |
| | | 0 | 0 | 1 | 0 | GND |
| | Display | 1 | 1 | X | 0 | Vr2 |
| | Reset | 1 | 0 | X | 1 | Vr2 |
| | Evolution | 0 | 1 | X | 1 | Vr2 |
| | Selection | 0 | 0 | 0 | 1 | Vr1 |
| | | 1 | 1 | 1 | 1 | Vr1 |
| | Display | 1 | 1 | X | 1 | Vr2 |

In Table 3, "MODE 1" means control in the pre-selection step and in the post-selection step, and "MODE 2" means control in the selection pulse application step. The mark "X" means that the signal may be H or L. (These are the same in Table 4.).

FIG. 25 shows the internal circuit of the data electrode driving IC 132 which outputs the driving waveform shown in FIG. 23. This data electrode driving IC 132 comprises a shift register 500, a latch 501, a comparator 502, a decoder 503, a level shifter/driver 504 with a high withstand voltage, a counter 505 and an analog switch 514. In the data electrode driving IC 132, an output evasion signal OE and a polarity conversion signal PC are inputted to the decoder 503. A strobe signal STB is inputted to the latch 501. An eight-bit data signal DATA, a shift clock signal CLK and a clear signal CLR are inputted to the shift register 500. A clock signal CCLK and a clear signal CCLR are inputted to the counter 505.

Operation of the data electrode driving IC 132 is described. In response to the eight-bit data signal DATA and the shift clock signal CLK, the shift register 500 sets the eight-bit data therein. Next, in response to the strobe signal STB, the data set in the shift register 500 is latched in the latch 501. Here, the counter 505 counts the output of the eight-bit data by using the clock signal CCLK. The comparator 502 compares the output of the latch 501 with the output of the counter 505, and when the output of the latch 501 is larger, the comparator outputs a high-level signal. The counter 505 counts further, and when the output of the latch 501 becomes smaller, the comparator outputs a low-level signal. Based on the output of the comparator 502, the output evasion signal OE and the polarity conversion signal PC, the decoder outputs a signal to drive the level shifter/driver 504.

Table 4 is a truth table of the data electrode driving IC 132. In accordance with the combination of the output of the comparator 502, the output evasion signal OE and the polarity conversion signal PC, the driving IC 132 outputs a voltage Vc1 or GND. By setting Vc1=V1 for the pre-selection step and for the post-selection step and by setting Vc1=V2 for the selection pulse application step, the waveform shown in FIG. 23 can be achieved.

TABLE 4

| Output of Decoder | OE | PC | Output |
|---|---|---|---|
| 1 | 0 | 0 | Vc1 |
| 1 | 0 | 1 | GND |
| 0 | 0 | 0 | GND |
| 0 | 0 | 1 | Vc1 |
| X | 1 | 0 | All GND |
| X | 1 | 1 | All Vc1 |

FIG. 26 shows the relationship between temperature and responsiveness of liquid crystal. As FIG. 26 shows, with respect to chiral nematic liquid crystal, the lower the temperature, the lower the responsiveness. Therefore, as the temperature of the liquid crystal becomes lower, a longer response time is necessary, and the length of the selection step must be changed in accordance with temperature. In order to avoid this, in the ninth example, as FIG. 27 shows, the response time is changed by changing the pulse width of the compensation pulse. In the ninth example, this is achieved by control of the LCD controller 136 over the scan electrode driving IC 131.

The upper curve in FIG. 27 shows a case in which the response time is set as to match with a first temperature (for example, 25° C.). The intermediate curve in FIG. 27 shows a case in which the response time is set as to match with a second temperature (for example, 20° C.) lower than the first temperature. The lower curve in FIG. 27 shows a case in which the response time is set as to match with a third temperature (for example, 15° C.) lower than the second temperature. Thus, by narrowing the pulse width of the compensation pulses as the temperature becomes lower, it is possible to have a necessary response time in any case while fixing the length of the selection step. The length of the selection step influences the scanning time. In the ninth example, the response time is changed as to match with the temperature without changing the length of the selection step, and the scanning time is never changed in accordance with the temperature.

Tenth Example of Matrix Driving; See FIG. 28

The tenth example is a way of changing the pulse width of the compensation pulses to make the scanning times of the respective display layers R, G and B of the three-layered liquid crystal display 100 equal to each other. The times to apply the compensation pulses are set in the LCD controller 136 beforehand.

Figure 28:
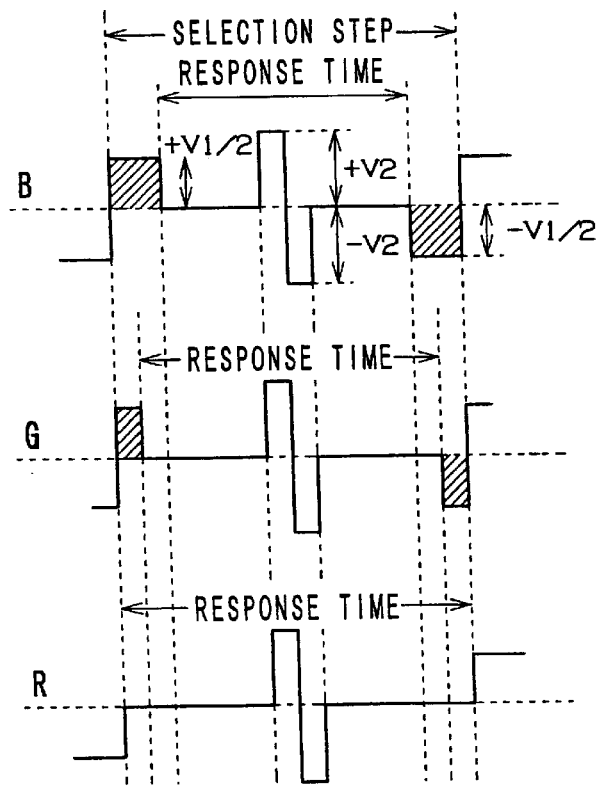
FIG. 28 is a chart which shows adjustment of the width of compensation pulses in a tenth example.

There are optimal response times respectively for the display layers 111B, 111G and 111R because of different mixing ratios of liquid crystalline compounds in the layers 111B, 111G and 111R. The response time of the blue display layer 111B shown by curve B in FIG. 28 is the shortest; the response time of the green display layer 111G shown by curve G in FIG. 28 is longer than that of the blue display layer 111B; and the response time of the red display layer 111R shown by curve R in FIG. 28 is the longest. Accordingly, the pulse width of the compensation pulses for the display layer 111R is set the shortest (for example, in curve R in FIG. 28, the pulse width is zero); the pulse width for the display layer 111G is set to an intermediate value; and the pulse width for the display layer 111B is set the longest. Thereby, the selection steps in the display layers 111R, 111G and 111B can be of the same length. The times to apply the reset pulse, the evolution pulse and the selection pulse in the display layers 111R, 111G and 111B are synchronized with each other.

In the tenth example, the scanning times in the respective layers can be equal to each other, and a large part of the control means (controller 136) which controls the times to apply the pulses can be shared by the display layers, which contributes to simplification of the controller 136.

Eleventh Example of Matrix Driving; See FIG. 29

The eleventh example is a combination of the ninth example and the tenth example. In the eleventh example, the scanning times in the respective display layers are made equal to each other, and the writing speed never changes with a change in temperature.

Figure 29:
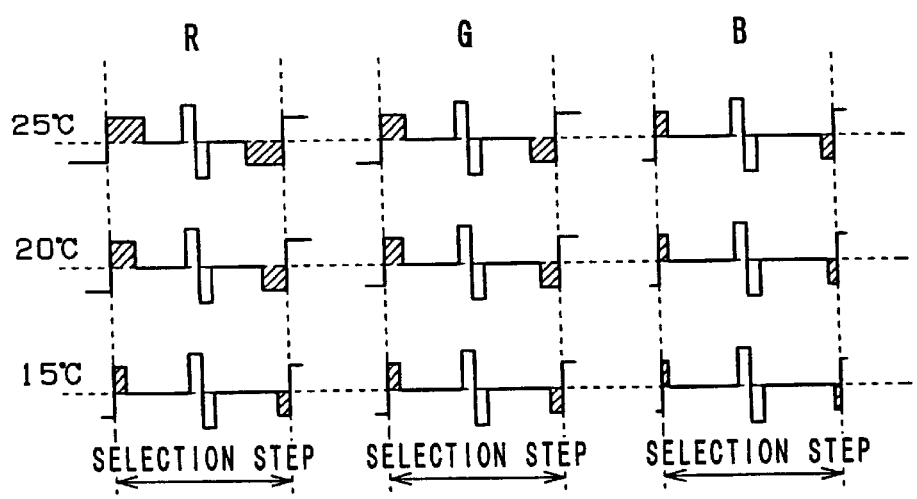
FIG. 29 is a chart which shows adjustment of the width of compensation pulses in an eleventh example.

As the upper, intermediate, and lower curves in FIG. 29 show, in the respective display layers, the selection steps are set to be of the same length, and the pulse width of the compensation pulses are set to respective optimal values. In each of the display layers, the pulse width of the compensation pulses is set narrower as the temperature becomes lower.

Twelfth Example of Matrix Driving; See FIG. 30

Figure 30:
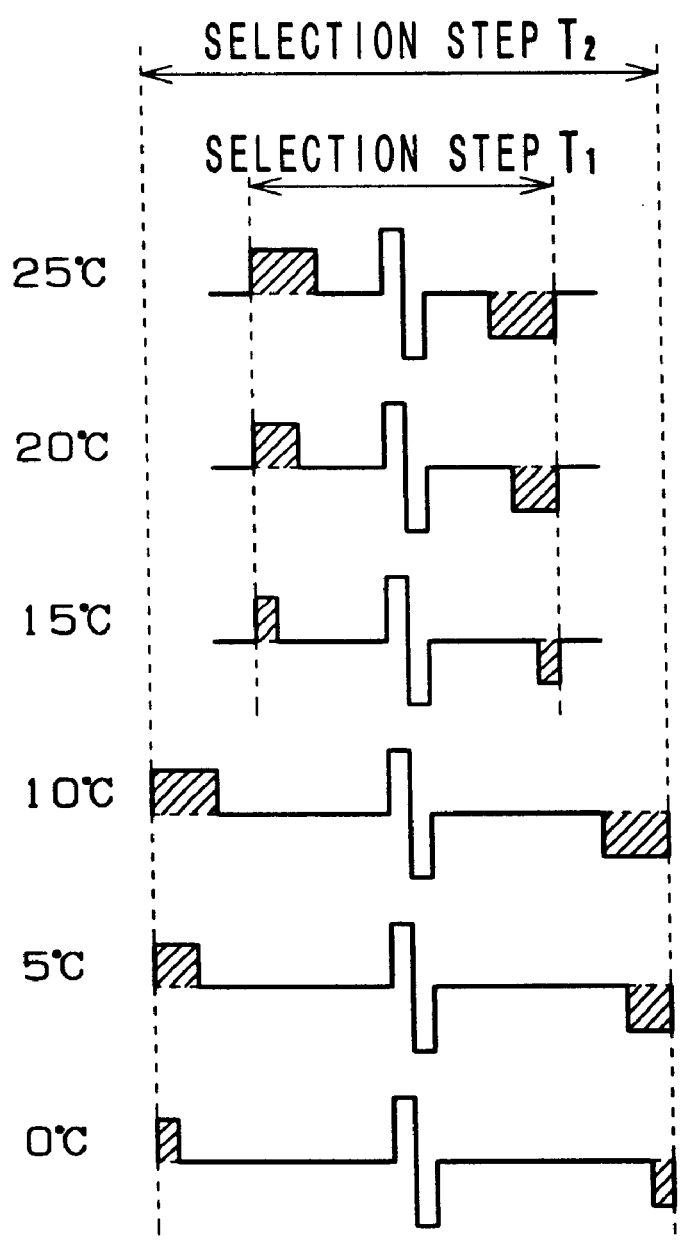
FIG. 30 is a chart which shows adjustment of the width of compensation pulses in a twelfth example.

In the twelfth example, the length of the selection step is varied in accordance with the temperature so as to widen the range in which the temperature compensation is possible. As FIG. 30 shows, in a first temperature range, for example, in a range not less than 15° C. and less than 30° C., the length of the selection step is set to $T_1$, and the width of the compensation pulses is varied within the length $T_1$. When the temperature becomes under the first temperature range, the temperature compensation cannot be realized merely by the variation of the compensation pulse width. Therefore, in a second temperature range under the first temperature range, for example, in a range not less than 0° C. and less than 15° C., the length of the selection step is set longer, i.e., to $T_2$, and the width of the compensation pulses is varied in the time $T_2$.

Thirteen Example of Matrix Driving; See FIG. 31

In the twelfth example, the length of the selection step is set to $T_1$ or $T_2$ depending on whether the temperature is in the first range or in the second range. In the thirteen example, as FIG. 31 shows, the length of the selection step is varied gradually in accordance with the temperature. For example, data for determining the length of the selection step by 5° C. are stored in the CPU 135, and linear interpolation is carried out to determine the length of the selection step in accordance with the actual temperature.

Fourteenth Example of Matrix Driving; See FIG. 32

In the fourteenth example, the width of the compensation pulses is variable, and the response time is controlled by varying the compensation pulse width so that the evolution voltages applied to the display layers 111R, 111G and 111B in the evolution step will be equal to each other.

The evolution voltage and the response time of each of the RGB display layers, as FIG. 32 shows, change almost in proportion to each other in a certain range. Therefore, in the range, by adjusting one of the evolution voltage and the response time, the other can be changed arbitrarily. Using this characteristic, the response time in each of the display layers is controlled by adjusting the compensation pulse width, whereby the evolution voltages applied to the respective display layers can be set equal to each other.

Referring to FIG. 32, when the evolution voltages in the display layers are set around 15V, the response time of the red display layer 111R is approximately 0.5 ms, that of the green display layer 111G is approximately 0.4 ms, and that of the blue display layer 111B is approximately 0.6 ms. In this case, if the length of the selection step is set to 0.6 ms, the width of the pre-compensation pulse and the post-compensation pulse in the red display layer is 0.05 ms, that in the green display layer is 0.1 ms, and that in the blue display layer is 0 ms. Since the evolution voltages in the respective display layers are all 15V, the power source circuit is simple.

Other Embodiments

The structure, the materials and the producing method of the liquid crystal display are arbitrary, and the liquid crystal display may be of any structure other than the three-layered type. The values of the voltages, the response times shown as the driving pulse waveforms and the temperatures are merely examples. In the ninth to fourteenth examples, compensation pulses are applied both in the pre-selection step and in the post-selection step; however, it is possible to apply a compensation pulse either in the pre-selection step or in the post-selection step.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method for driving a liquid crystal display which comprises liquid crystal which exhibits a cholesteric phase and is capable of keeping an image displayed thereon after turn-off of an electric field applied thereto, said method comprising:

a reset step of applying a reset pulse to make the liquid crystal come to a homeotropic state;

a selection step of, after the reset step, selecting a final state of the liquid crystal; and an evolution step of, after the selection step, applying an evolution pulse to stabilize the liquid crystal to the final state selected in the selection step;

wherein the selection step comprises:

a first step which comprises a time of applying substantially 0 volt to the liquid crystal;

a second step of, after the first step, applying a selection pulse to select the final state of the liquid crystal; and a third step, after the second step, which comprises a time of applying substantially 0 volt to the liquid crystal.

2. A method according to claim 1, wherein the reset step, the selection step and the evolution step have time lengths and wherein two of the time lengths are multiples of the other one of the time lengths.

3. A method according to claim 1, wherein the selection pulse is of a lower voltage than the reset pulse.

4. A method according to claim 1, wherein the final state of the liquid crystal is selected by varying a pulse width of the selection pulse.

5. A method according to claim 1, wherein in the second step, a pulse width of the selection pulse is varied in accordance with the selected final state of the liquid crystal.

6. A method according to claim 1, wherein:
the liquid crystal display comprises a plurality of scan electrodes and a plurality of data electrodes which are arranged to face and cross each other with the liquid crystal in-between; and
a plurality of display units are defined by the scan electrodes and the data electrodes.

7. A method according to claim 6, wherein the scan electrodes are selected serially to be subjected to at least the selection step and the evolution step.

8. A method according to claim 7, wherein the scan electrodes are selected serially to be subjected to the reset step.

9. A method according to claim 7, wherein all of the scan electrodes are selected at one time to be subjected to the reset step.

10. A method according to claim 9, wherein while the display units on one of the scan electrodes are in the selection step, the evolution pulse which is of a voltage with an absolute value more than 0 is applied to a scan electrode which is to come to the selection step next.

11. A method according to claim 7, wherein the scan electrodes are selected serially at lags of a time corresponding to the length of a selection step.

12. A method according to claim 11, wherein at least one of the first step or the third step includes a time of applying a compensation pulse to avoid necessity of changing the length of the selection step.

13. A method according to claim 12, wherein the compensation pulse has a form which is determined in accordance with temperature.

14. A method according to claim 12, wherein:
the liquid crystal display has a plurality of liquid crystal layers which are laminated together; and
a compensation pulse is applied to at least one of the liquid crystal layers.

15. A method according to claim 14, wherein applying a compensation pulse to at least one of the liquid crystal layers makes all of the liquid crystal layers have a same scanning speed.

16. A method according to claim 15, wherein a first compensation pulse is applied to a first one of the liquid crystal layers and a second compensation pulse is applied to a second one of the liquid crystal layers, and wherein forms of the compensation pulses which are applied to the respective liquid crystal layers are determined individually.

17. A method according to claim 12, wherein:
the liquid crystal display has a plurality of liquid crystal layers which are laminated together;
in the evolution step, a respective evolution pulse is applied to a respective liquid crystal layer; and
the evolution pulses which are applied to the respective liquid crystal layers are equal to each other in voltage and/or maximum application time.

18. A method according to claim 11, wherein each of the first step and the third step includes a time of applying a compensation pulse to avoid necessity of changing a length of the selection step.

19. A method according to claim 1, wherein at least one of the first step and the third step includes a time of applying a compensation pulse to compensate for a change in responsiveness of the liquid crystal with a change in temperature.

20. A method according to claim 19, wherein each of the first step and the third step includes a time of applying the compensation pulse.

21. A method according to claim 8, wherein the scan electrodes are selected serially at lags of a specified time.

22. A method according to claim 21, wherein the reset step has a length of time corresponding to a multiple of the specific time, and wherein the reset pulse includes a plurality of periods each of which is equal to the specific time.

23. A method according to claim 22, wherein each two consecutive periods of the plurality of periods constitute a former period and a latter period, and wherein a pulse element of the reset pulse which appears last in the respective former period and a pulse element of the reset pulse which appears first in the respective latter period are of a same polarity.

24. A method according to claim 21, wherein the evolution step has a length of time corresponding to a multiple of the specific time and the evolution pulse includes a plurality of periods each of which is equal to the specific time.

25. A method according to claim 24, wherein each two consecutive periods of the plurality of periods constitute a former period and a latter period, and wherein a pulse element of the evolution pulse which appears last in the respective former period and a pulse element of the evolution pulse which appears first in the respective latter period are of a same polarity.

26. A method according to claim 5, wherein:
the second step includes a first period of applying a pre-selection pulse and a second period of applying a post-selection pulse; and
the pre-selection pulse and the post-selection pulse are of mutually opposite polarities.

27. A method according to claim 26, wherein:
a pulse width of the pre-selection pulse is adjusted based on a beginning of the first period; and
a pulse width of the post-selection pulse is adjusted based on a beginning of the second period.

28. A method according to claim 26, wherein:
a pulse width of the pre-selection pulse is adjusted based on an end of the first period; and
a pulse width of the post-selection pulse is adjusted based on an end of the second period.

29. A method for driving a liquid crystal display which comprises liquid crystal which exhibits a cholesteric phase and is capable of keeping an image displayed thereon after turn-off of an electric field applied thereto, and a plurality of scan electrodes and a plurality of data electrodes which are arranged to face and cross each other with the liquid crystal in-between, the scan electrodes and the data electrodes defining a plurality of display units, said method comprising the steps of:
applying a first voltage signal to one of the scan electrodes which defines display units which are to keep displaying an image; and
applying a second voltage signal in accordance with image data to the data electrodes so that crosstalk pulses are applied to the display units which are to keep displaying an image;
wherein the first voltage signal and the second voltage signal have respective waveforms which fulfill the condition that the crosstalk pulses are smaller than the second voltage signal in pulse width.

30. A liquid crystal display device comprising:
a liquid crystal display comprising:
liquid crystal which exhibits a cholesteric phase and is capable of keeping an image displayed thereon after turn-off of an electric field applied thereto; and
a plurality of scan electrodes and a plurality of data electrodes which are arranged to face and cross each other with the liquid crystal in-between;

a scan electrode driver which is connected to the scan electrodes and which is capable of outputting voltages at exactly not more than three different levels;

a data electrode driver which is connected to the data electrodes and which is capable of outputting voltages at not more than two different levels, wherein the plurality of scan electrodes and the plurality of data electrodes define a plurality of display units of the liquid crystal display, and a control section which executes:

a reset step of applying a reset pulse to reset liquid crystal in the display units on at least one of the scan electrodes to a homeotropic state by controlling the scan electrode driver to output a first voltage signal including at least one voltage which is selected from the three levels to the at least one scan electrode and by controlling the data electrode driver to output a second voltage signal including at least one voltage which is selected from the two levels to all the data electrodes;

after the reset step, a pre-selection step which comprises a time of applying substantially 0 volt to liquid crystal in display units on at least one selected scan electrode by controlling the scan electrode driver to output a third voltage signal including at least one voltage which is selected from the three levels to the at least one selected scan electrode and by controlling the data electrode driver to output a fourth voltage signal including at least one voltage which is selected from the two levels to all the data electrodes;

after the pre-selection step, a selection pulse application step of applying a selection pulse to select a final state of the liquid crystal of the display units on the at least one selected scan electrode by controlling the scan electrode driver to output a fifth voltage signal including at least one voltage which is selected from the three levels to the at least one selected scan electrode and by controlling the data electrode driver to output a sixth voltage signal including at least one voltage which is selected from the two levels to all the data electrodes;

after the selection step, a post-selection step which comprises a time of applying substantially 0 volt to the liquid crystal on the display units on the at least one selected scan electrode by controlling the scan electrode driver to output a seventh voltage signal including at least one voltage which is selected from the three levels to the at least one selected scan electrode and by controlling the data electrode driver to output an eighth voltage signal including at least one voltage which is selected from the two levels to all the data electrodes;

after the post-selection step, an evolution step of applying an evolution pulse to stabilize the final state of the liquid crystal in the display units on the at least one selected scan electrode by controlling the scan electrode driver to output a ninth voltage signal including at least one voltage which is selected from the three levels to the at least one selected scan electrode and by controlling the data electrode driver to output a tenth voltage signal including at least one voltage which is selected from the two levels to all the data electrodes.

31. A liquid crystal display device according to claim 30, wherein in the selection step, the selection pulse has a pulse width which is adjusted in accordance with the final state of the liquid crystal.

* * * * *